United States Patent
Kazmierowicz et al.

(10) Patent No.: US 6,453,219 B1
(45) Date of Patent: Sep. 17, 2002

(54) METHOD AND APPARATUS FOR CONTROLLING TEMPERATURE RESPONSE OF A PART IN A CONVEYORIZED THERMAL PROCESSOR

(75) Inventors: Philip C. Kazmierowicz; Eric Dransfeldt; Stanley Douglas Schultz, all of San Diego, CA (US)

(73) Assignee: KIC Thermal Profiling, San Diego, CA (US)

( * ) Notice: Subject to any disclaimer, the term of this patent is extended or adjusted under 35 U.S.C. 154(b) by 0 days.

(21) Appl. No.: 09/401,749

(22) Filed: Sep. 23, 1999

(51) Int. Cl.$^7$ ............ G05D 23/00; G06F 19/00; G05B 13/02
(52) U.S. Cl. ............ 700/299; 700/207; 700/209; 700/212; 700/33
(58) Field of Search ............ 700/299–300, 700/207, 209–212, 274, 28–30, 32–33, 44, 45; 110/185, 190

(56) References Cited

U.S. PATENT DOCUMENTS

| | | | |
|---|---|---|---|
| 3,621,213 A | 11/1971 | Jen et al. | 235/150 |
| 3,793,717 A | 2/1974 | Degenkolb et al. | 29/610 |
| 4,176,554 A | 12/1979 | Kazmierowicz | 73/341 |
| 4,242,907 A | 1/1981 | Kazmierowicz | 73/341 |
| 4,501,552 A | 2/1985 | Wakamiya | 432/49 |
| 4,688,180 A | 8/1987 | Motomiya | 364/477 |
| 4,775,542 A | 10/1988 | Manser et al. | 364/555 |
| 4,982,347 A | 1/1991 | Rackerby et al. | 364/557 |
| 5,003,160 A | 3/1991 | Matsuo et al. | 219/494 |
| 5,099,442 A | 3/1992 | Furuta et al. | 700/274 |
| 5,396,416 A * | 3/1995 | Berkowitz et al. | 700/45 |
| 5,439,160 A | 8/1995 | Marcantonio | 228/102 |
| 5,457,625 A * | 10/1995 | Lim et al. | 700/29 |
| 6,168,064 B1 * | 1/2001 | Berkin | 228/9 |
| 6,207,936 B1 | 3/2001 | De Waard et al. | 219/497 |
| 6,275,750 B1 * | 8/2001 | Uchida et al. | 700/300 |

FOREIGN PATENT DOCUMENTS

| | | | |
|---|---|---|---|
| DE | 2311616 | 9/1973 | 364/477 |
| WO | WO 97/28669 | 8/1997 | H05B/1/02 |

OTHER PUBLICATIONS

Saunders Technology, Inc., "Profile Wizard™", 1999, 2 pages.
Ernest L. Hall, *Computer Image Processing and Recognition*, ©1979, Academic, pp. 202–205.
Joel H. Ferziger, *Numerical Methods for Engineering Applications* 2/e, ©1998, John Wiley, pp. 283–285.
G. E. B. Box, et al., "On the Experimental Attainment of Optimum Conditions", *J. Royal Statistical Society*, series B, v. xiii, No. 1, 1951, pp. 1–5.
Jyh–Shing Roger Jang, *Neuro–fuzzy and Soft Computing*, ©1997 Prentice–Hall, pp. 156–193.
Germund Dahlquist, et al., *Numerical Methods*, ©1974 Prentice–Hall, pp. 438–441.
Berc Rustem, *Algorithms for Nonlinear Programming and Multiple–Objective Decisions*, ©1998 John Wiley, pp. 59–63, 267–269.
Donald A. Pierre, *Optimization Theory with Applications*, ©1969 Dover, pp. 296–319.
William T. Press, et al., *Numerical Recipies in Fortran* 2/e, ©1992 Cambridge, pp. 402–409, 413–417.

* cited by examiner

*Primary Examiner*—Leo P. Picard
*Assistant Examiner*—Ryan Jarrett
(74) *Attorney, Agent, or Firm*—Thelen Reid & Priest LLP; David B. Ritchie

(57) ABSTRACT

A method and apparatus for controlling the temperature response profile of a part being exposed to heating and/or cooling conditions in a thermal processor incorporates measured data from the part to adjust the thermal processor control settings by closed loop feedback.

45 Claims, 6 Drawing Sheets

METHOD AND APPARATUS FOR CONTROLLING TEMPERATURE RESPONSE OF A PART IN A CONVEYORIZED THERMAL PROCESSOR

STATEMENT OF RELATED APPLICATION

This application is related to U.S. patent application Ser. No. 09/404,572 filed on the same date here entitled "Method and Apparatus for Optimizing Control of a Part Temperature in a Conveyorized Thermal Processor" and with the name of inventors Steven Arthur Schultz and Philip C. Kazmierowicz commonly assigned to KIC Thermal Profiling.

FIELD OF THE INVENTION

The present invention relates to an improved method for controlling temperature response of a part in a conveyorized thermal processor by means of closed-loop feedback.

BACKGROUND OF THE INVENTION

Thermal processing involves a series of procedures by which an item may be exposed to a temperature-controlled environment, and is used in a variety of manufacturing procedures such as heat treating, quenching and refrigerated storage. One example of a thermal processor is a reflow oven. The production of various goods such as electronic circuit boards in solder reflow ovens frequently entails carefully controlled exposure to heating and/or cooling for specific periods. The elevated temperature conditions needed to solder component leads onto printed circuit boards must be gradually and uniformly applied to minimize thermal expansion stresses. For this reason, convection heat transfer may be employed in these solder "reflow" operations. The connecting solder paste incorporates an amalgam of substances that must undergo phase changes at separate temperature levels. Solder reflow may be performed by sequentially passing a part (such as a printed circuit board to become a processed product) through a series of thermally isolated adjacent regions or "zones" in the reflow oven, the temperature of each being independently controlled.

Convection heat transfer chambers or zones are typically set to a fixed control temperature throughout a thermal process. A zone may have one or more controlled thermal elements, these each having a corresponding control monitoring location. A thermal element may be defined as either a heat source for heating or a heat sink for cooling and may be commanded to a control temperature. The temperatures commanded at the control monitoring locations form a "control temperature profile" along the reflow oven. The temperature exposure of the part may be governed by the processor temperature of the air in each zone and the exposure time within each region. The temperature of the air along the zones forms a "processor temperature profile". The series of instantaneous part temperature values as the part travels along the conveyor and through the oven may be called a "part temperature profile" and if based on measured data may be called a "measured part temperature profile". The temperature response of the part must satisfy a manufacturer's part specification requirements, which include allowable tolerance bands or tolerance limits around target values that have been defined. A measured value within the corresponding tolerance limit satisfies the specification. The procedure for operating the oven to obtain temperature data (used in creating a measured part temperature profile) may be called a "test process".

The temperature response of the part may be monitored by instrumenting the part or adjacent device with one or more thermocouples (or other temperature measuring contact devices such as thermistors or resistance temperature detectors) prior to sending the part into the reflow oven or by remote observation with a thermal sensor. Alternatively, the temperature response of the part may be measured by a remote means such as an infrared or optical scanner. The thermocouple measurements can be sent to a data acquisition device through an attached cable or by a radio transmitter or by similar means. The temperature along the conveyor may also be measured by different means. Two examples are a thermocouple attached to the conveyor (though not in thermal contact) so that it moves along with the part, and a fixed probe extending along the length of the oven and positioned adjacent to the conveyor having a plurality of thermocouples disposed along the probe interior.

A thermal processor, such as a reflow oven, may be modulated by a series of n control parameters labeled $C_j$ numbering from j=1 to n. These control parameters may include the oven setpoint temperature at each zone, the conveyor speed, product conveyor density (number of parts per unit conveyor length), or a combination of these and other variables subject to direct adjustment or indirect influence during the thermal processor operation. Other physical influences on the thermal process include initial conditions, which may depend on the ambient temperature and humidity, as well as characteristics difficult to measure directly, such as convection rate. These may be referred to in the aggregate as noncontrollable processor parameters.

A side view diagram of a reflow oven is shown in FIG. 1 as an example of a thermal processor. The reflow oven 10 has a conveyor 12 aligned along the length of It the oven 10 that moves in the direction towards the right from entrance 14 to exit 16. The oven interior may be divided into two or more zones for thermal processing. In the illustration, first and second zones 18a and 18b are shown. Each zone has at least one heating and/or cooling element 20a and 20b and may feature one or more monitoring instruments 22a and 22b in proximity to the elements to monitor thermal processing. These element monitoring instruments 22a and 22b may be thermocouples or thermostats. The oven 10 may also include one or more recirculation fans 24 to increase convection. The conveyor 12 may be moved by means of a conveyor motor 26a; the fan may be rotated by means of a fan motor 26b. The settings for heating and/or cooling elements 20a and 20b, and the motors 26a and 26b are controlled by a control station 28, which receives settings input from a receiver 30 instructed by an operator 32 or other means. Each control parameter may be commanded to a target condition at a control interface between the input receiver 30 and the control parameter. The example shown in FIG. 1 features a first zone interface 34a, a second zone interface 34b, a conveyor interface 34c and a fan control 34d. These control parameters may be expressed as C values in a series of n dimensions where each control parameter may be identified as one of $C_1, C_2, \ldots, C_n$ or as $C_j$ where j=1 to n. In the example shown in FIG. 1, n equals 4. Measured data from instruments monitoring control performance such as element monitoring instruments 22a and 22b may be received by a data acquisition device 36a and recorded on a storage medium 36b.

The response of the thermal processor to the settings of the control parameters may not be identical to the $C_j$ values. This processor response may be characterized as processor parameters labeled C' in a similar series of n dimensions. In conjunction with the processor parameters C' may be measured and these data recorded. The correlation between the control parameters C and the process parameters C' may be influenced by the rate of convection, the thermal isolation across zones and the ability of the thermal elements to attain the target control parameter values. In practice, the process parameters may fluctuate with time around a local or running average $\overline{C}'$. Process deviance tolerances may be specified or defined, which if exceeded may cause the thermal processor to discontinue. These tolerances may be expressed as absolute differences between the control parameters and their corresponding average processor parameters $|C-\overline{C}'|_j$ for series j=1 to n. After the thermal processor has had sufficient time (t→∞) for processor parameters to reach thermal equilibrium (assuming the control parameters are held to fixed values), such that the process parameters C' vary only within a specified equilibrium range or tolerance $\epsilon_{Cj}$, that difference $|C-C'|_j$ may be expected to vary within that equilibrium range expressed as $|C-C'|_j \leq \epsilon_{Cj}$.

A part 38, such as a printed circuit board, may be placed on the conveyor 12 upstream of the oven entry 14 to be transported through the oven 10 and egressing through the exit 16. The time-varying thermal exposure may be obtained by using a series of adjacent first and second zones 18a and 18b at a conveyor speed such that part location in the oven 10 may be defined by conveyor speed multiplied by time since entry. Temperature of the part 38 may be monitored remotely by an infrared or optical scanner or else measured conductively by one or more attached thermal sensors such as a thermocouple 40. The measured part temperature data from the thermocouple 40 may be transmitted to the data acquisition device 36a, either by direct connection or broadcast signal, and recorded on storage medium 36b.

The part profile specification 42 may be provided to the operator 32 to compare the part temperature profile with the specification ranges and with which to manually adjust the control parameters in the control station 28. The specification ranges represent the allowable limits for calculated feedback parameters that are selected to characterize the thermal process for the part. These feedback parameters may be written as B values in a series of m dimension where each feedback parameter may be identified as one of $B_1$, $B_2$, ... $B_m$, or as $B_i$ where i=1 to m. The amount by which a measured value deviates from the middle of its specification range corresponds to a feedback index, and the maximum of these feedback indices denotes the Process Window Index S for that thermal process.

Temperature response of a part to a convective heat transfer environment depends on essentially four factors: the part's initial temperature (denoted by superscript 0), the ambient temperature of the environment to which the part may be exposed, the convection coefficient which depends on characteristics of the fluid medium and its motion, and the physical and material properties of the part itself. In a reflow oven, the ambient temperature varies with distance along the conveyor path, which to the part travelling along that path effectively varies with time t. Convective conditions may be expressed by the nondimensional quantity Nusselt number Nu. The part's transient response may be expressed by two additional nondimensional quantities: Biot number Bi and Fourier number Fo, as is well known in the art. These three nondimensional quantities may be collectively treated as functions of fluid velocity u (which in turn may be dependent on the fan speed ω), thermal conductivity k of the fluid heat transfer medium (air, in the case of a reflow oven) and of the part (which may be treated as a constant bulk property for simplicity in many applications), density ρ of the fluid (subscript a) and the part (subscript p), and heat capacity c of the fluid and the part. Thus the part's transient heat transfer response may be expressed as a function in equation (1).

$$T_p(t) = f\{T_p^0, T_z(t), Nu, Bi, Fo\} = f\{T_p^0, T_z(t, u_c), u(\omega), k_p, \rho_p, c_p, k_a, \rho_a, c_a, x_p\} \quad (1)$$

in which t is time, time-varying $T_p$ is the part temperature, $T_z$ is the processor (or thermal source) temperature, u is air velocity, $u_c$ is conveyor speed, and $x_p$ constitutes one or more characteristic length dimensions of the part which relate to wetted area and/or it volume. Another factor related to conveyor speed might be loading density of parts on the conveyor. In some circumstances, a part may have sufficient heat capacity so that several of them close together on a conveyor may absorb thermal energy so as to reduce the part temperature rise rate from that of an isolated part on the conveyor. This condition may be controlled by a parts loader to the conveyor.

Temperature variation may be compared along the reflow oven's length between the commanded temperatures for the elements, the measured zone temperatures, the measured temperature response for the part and the corresponding specification range for the part. A graph showing temperature along the conveyor path is shown in FIG. 2. The temperature scale forming the ordinate 50 may be plotted against the abscissa 52 or distance axis along the conveyor path. The first zone 54a and second zone 54b encompasses a spatial region across a portion of the oven distance 52. The control temperature levels for each zone region can be appended to form a control profile 56 that may be piece-wise continuous along the distance axis 52. Processor temperatures measured (or otherwise determined) near the thermal elements form a processor profile 58. The processor temperature in processor profile 58 often deviates from the control temperature in control profile 56 by a small quantity under convective heat transfer due to cross flow between zones and other physical effects.

The part exhibits a temperature response based on temperature measurements over time along the oven length. This response may be plotted as a part profile 60 along the distance axis 52 by multiplying the conveyor speed by the time from the part's entry into the oven. Air (the heat transfer medium in the oven) has a relatively low thermal conductivity (compared to the part) with which to convect heat from thermal elements to the part surface. Due to the low convection and the part's internal heat capacity by virtue of its mass, the part response temperature along part profile 60 will lag the control temperature 56 set in the zone region to which the part may be exposed.

The part temperature profile 60 may be evaluated for particular characteristics earlier referred to as feedback parameters related to the thermal process specification. For example, the maximum temperature rise rate 62 may be determined from a discrete temperature increase 62a over a selected time interval 62b, preferably when the temperature increases relatively steadily for the selected time interval 62b. Additionally, the peak part temperature 64 may be determined by the highest measured temperature along the part temperature profile 60. Similarly, "time above reflow" may be ascertained as a reflow time interval 66 by establishing the time period when the part temperature profile 60 exceeds the reflow temperature level 66a beginning at the initial time 66b and ending at final time 66c. These feedback parameter values may be compared to specified ranges that the profile must be within in order to have been properly thermally processed. The maximum temperature rise rate 62 may be compared to the rise rate range, featuring a minimum acceptable rate 68a and a maximum acceptable range 68b. Typically, a temperature rise rate may apply over a narrow and specific time interval, and associated with a particular zone. The peak part temperature 64 may be compared to the peak range bounded by a minimum accepted peak temperature 70a and a maximum accepted temperature 70b. Similarly, the reflow time interval 66 may be compared to the reflow time range, with a minimum accepted period 72a and a maximum accepted period 72b. The closer the feedback parameters conform to the middle of the ranges, the smaller its feedback index, the maximum of which yields the Process Window Index described in more detail below.

Typically in the past, the test procedure for a reflow thermal process involves having an operator set the oven controls, allow sufficient time for the processor temperatures in each zone to reach thermal equilibrium, set the conveyor speed, and send an instrumented part through the oven. Thermal equilibrium may be defined as a steady-state condition in which the processor temperature has stabilized (preferably within a defined processor deviance range around its corresponding control parameter value) and whose average does not change with time. In practice, a small fluctuation within a specified processor equilibrium range may be allowed. After a comparison between the part's target temperatures and its measured values along the oven length, the operator guesses or estimates changes to the control parameters or the conveyor speed. The operator implements the guess and repeats the process over and over until the temperature difference between target and measurement may be reduced to an allowable tolerance labeled a part's response tolerance. An allowable tolerance constitutes an acceptable deviation from the target temperature profile for the part. The trial and error method can be time consuming and requires an experienced operator to implement.

In an improvement to the earlier procedure, guessing the control adjustment may be replaced with a computer executed algorithm that computes a part temperature difference profile between the target and measured values, and uses this difference profile in another algorithm that provides a series of changes to the control parameters in order to bring the measured part temperature profile closer to its target temperature profile. By successive iteration, control parameters to achieve allowable part response tolerances may be established within two to five attempts—more quickly than through trial and error. The algorithms used in that method, however, require knowledge of the material properties of the board along with information on the nature of air current It within the zone, limiting the method's practicality and complicating its implementation.

In an improvement to the earlier procedure, a feedback mechanism may be included which compares measurement-based data against a series of specified tolerances to indicate whether the part temperature responses satisfy the required conditions imposed by the part manufacturer. The numerical sign for whether the required conditions are satisfied may be called the Process Window Index, which represents a nondimensional measure of a part temperature profile to identify whether that profile satisfies the specification imposed by manufacturing requirements. It provides the operator a quantitative indicator of whether the control parameters require adjustment for production-mode thermal processing.

The Process Window Index, S, is a nondimensional positive real number described by a series of measured or measurement-derived parameters $B_i$ numbering from i=1 to m each compared to its allowable tolerance band that the value for $B_i$ must be within to satisfy the required conditions. These measured or measurement-derived parameters, which are hereafter called calculated feedback parameters, form a plurality of data values. One example of a measured parameter for $B_i$ is a peak temperature of the part $T_p^{peak}$ as it moves along the conveyor in the reflow oven. A peak temperature on a part may be measured on at least one location on the part, and typically a plurality of temperatures may be obtained at different locations on the part in order to monitor the spatial nonuniformity of the part's transient response.

An example of a measurement-derived parameter for $B_i$ would be a maximum of part temperature change with respect to time which may be called part temperature change rate labeled as $\partial T_p/\partial t$. (The "$\partial$" sign represents the partial derivative in differential equations.) Such a quantity is typically not directly measured, but may be found in discretized form by subtracting part temperature measured at two separate times and dividing by the elapsed time between the measurements. The part temperature change rate may be typically monitored to minimize the risks of physical distortion of the part and maximize production throughput, and thus represents an important parameter to monitor. A second example of a measured-derived parameter used in electronics thermal processing applications is the "time above reflow" $t_{ar}$: ($T_p \geq T_{liq}$) meaning the period during which the part temperature has reached or exceeded the solder liquefaction temperature. This time above reflow may be monitored so as to better enable adequate liquification of the solder for a proper electrical connection between the printed circuit board and its mounted components, without damaging that board from excessive exposure to elevated temperatures.

An allowable part response tolerance band may be described by its maximum and minimum values. The Process Window Index represents the largest excursion relative to the tolerance bands from the series of calculated feedback parameters. An expression for the Process Window Index S may thus be shown as equation (2):

$$S = \max\{|(B_i - \beta^+_i)|/\beta^-_i \forall i=1, \ldots, m\} \quad (2)$$

where $\beta^+_i = (B_{imax} + B_{imin})/2$ or midpoint within the tolerance band and $\beta^-_i = (B_{imax} - B_{imin})/2$ or allowed excursion from the midpoint. (The symbol $\forall$ means "for all".) The values $B_{imax}$ and $B_{imin}$ represent the maximum and minimum limits within the tolerance band from the target value (typically the midpoint $\beta^+_i$) for the feedback parameters $B_i$. The Process Window Index is the maximum normalized absolute value of the deviation with respect to the tolerance bands of all feedback parameters, and when displayed may be multiplied by one-hundred to provide a percentage value for the amount of tolerance "window" that is taken in the test process. This represents the typical form by which Process Window Index is provided to the operator. In order to satisfy the specification requirements, the percentage yielding Process Window Index in this percentage form should have an absolute value of less than one-hundred.

The centered capability ratio $C_{pk}$ represents a complimentary parameter to the Process Window Index. Unlike the Process Window Index that determines thermal processor compliance to the part temperature profile from the specification requirements, the centered capability ratio comprises the lesser of the lower and upper data deviation boundaries. For example, let $B_{imin}$ represent the lower bound of a feedback parameter tolerance band, $B_{imax}$ the upper bound, $\bar{B}_i$ the average of the data for the $i^{th}$ feedback parameter and $\sigma_B$ is the standard deviation. Then the centered capability ratio may be expressed as equation (3):

$$C_{pk} = \min\{(B_{imax} - \bar{B}_i)/3\sigma_B, (\bar{B}_i - B_{imin})/3\sigma_B\} \quad (3)$$

Typically, a $C_{pk}$ value of 1.33 or higher may be desired, as indicating the data are not changing unexpectedly.

In the procedure to obtain the Process Window Index, calculated feedback parameters are compared in the above-described normalized form, and include parameters such as peak rise rate in the part temperature profile, time period that the part temperature profile is within a specified temperature range, and part temperature profile peak value within the reflow oven. Individual parameters may represent the dominant characteristic in local portions of the reflow oven. For example, part temperature rise rate generally reaches its peak in the initial zones, since the temperature difference between the part initially at room temperature and the first reflow oven zones that the part encounters may often be higher than the temperature difference between the partially heated part and the subsequent elevated control temperature zones. The peak value of part temperature may be typically attained towards the end of the reflow process where the control temperature setting may be highest.

Examination of the Process Window Index enables an operator to determine whether adjustment of the control parameters for the thermal process may be required. However, the solutions to improve the Process Window Index towards a lower value need not be unique, and so the operator must choose from several options, often based on arbitrary criteria. The additional requirement of having the operator input the control adjustment also affords an opportunity for control errors to be introduced.

One method by which part temperature response might be characterized absent measured test data beyond that acquired during the test process may be by prediction. FIG. 3 illustrates differences between discretized temperature values for the measured part and processor temperature profiles from the test process, which are plotted on a graph with temperature as the ordinate 50 and distance along the oven as the abscissa 52. In this example, the zones 54a and 54b extend across the oven distance. The control temperatures would correspond to the first two control parameters. The control temperature profile 56 showing the commanded values, processor temperature profile 58 reflecting the oven response, and the part temperature profile 60 featuring the part's thermal response to oven exposure are plotted on the graph together. These profiles may be sampled for specific points along the distance axis. A part temperature $T_p(\iota)$ point 80 on the part temperature profile 60 may be selected at interval $\iota$ for a particular distance value 82, with the temperature value corresponding to this point 80 associated with a level 84. At the next interval $\iota+1$, another part temperature $T_p(\iota+1)$ point 86 may be selected at distance 88 and temperature level 90. The distance increment 92 lies between intervals $\iota$ and $\iota+1$. The change in part temperature between levels 84 and 90 may be identified as a part response difference 94 expressed as $T_p(\iota+1)-T_p(\iota)$ across that distance increment 92.

A processor temperature $T_z(\iota)$ point 96 on processor temperature profile 58 may also be selected at interval $\iota$, corresponding to distance 88 and temperature level 98. The control temperature $T_c(\iota)$ may also be identified at this distance 88 at interval $\iota$. The difference between the processor temperature level 98 and the part temperature level 84 for interval $\iota$ at distance 88 may be denoted in the form $T_z(\iota)-T_p(\iota)$ as a thermal driver difference 100. The response difference 94 may be divided by the driver difference 100 to produce a temperature difference ratio labeled $R_t$ and may be expressed at interval $\iota$ in equation (4):

$$R_t(\iota)=\{T_p(\iota+1)-T_p(\iota)\}/\{T_z(\iota)-T_p(\iota)\} \quad (4)$$

Alternate formulas may be used to correlate between part temperature transient response and the temperature difference between processor and part. Those of ordinary skill in the art will readily recognize that a plurality of correlation options are available.

Part response temperature also depends on conveyor speed as the third control parameter for the example discussed above. The conveyor speed governs exposure time of the part within each zone. If the conveyor speed is altered between the test process and the predicted process, the temperature difference ratio $R_t$ may be multiplied by the conveyor speed ratio defined by $R_s=[u_c/u_c']^b$ where $u_c$ is the conveyor speed during the measured thermal process, $u_c'$ is the new speed for the response temperature prediction, and b is the power exponent. Typically this exponent b may be unity for a wide variety of electronic part designs. If the conveyor speed ratio $R_s$ is constant throughout a thermal process and it may be treated as a scalar, unlike the temperature difference ratio $R_t(\iota)$ that may be separately calculated for each increment $\iota$. Otherwise it may be expressed as a ratio series.

Another controllable factor for part response temperature may be the fan speed, which governs the rate of convective heat transfer. While a convective heat transfer coefficient may be derived using analytical tools well known in the art, such techniques typically require measured data which are subject to large uncertainties and/or more difficult to obtain in a thermal processor than temperature values. Consequently, a cubic spline function may be used to approximate the functional relationship between the rate of change in part temperature and the conveyor speed, which may be either controlled and/or measured. For example, the part temperature rate change as it varies along the thermal processor may be expressed for a one-dimensional relation in equation (5):

$$\partial T_p/\partial t = f(u_c) \approx \eta_1 u_c^3 + \eta_2 u_c^2 + \eta_3 u_c + \eta_4 \quad (5)$$

where $\omega$ represents the angular fan velocity and $f$ expresses a cubic spline relation defined such that first and second derivatives $f'(u_c)$ and $f''(u_c)$ are continuous, and the $\eta$ coefficients in the cubic expression are solved by methods well known in the art.

Another measure to characterize the thermal processor uses a comparison between the zone temperature and the control temperature. This may be expressed as a processor ratio $R_z$ of zone temperature to control temperature (both in absolute value, such as degrees Rankine or Kelvin) such as $R_z(\iota)=T_z(\iota)/T_c(\iota)$, and may be calculated for each increment $\iota$. While the processor ratio at a particular increment may be stable for one set of conditions, a change from these conditions may alter the processor ratio, even after thermal equilibrium has been achieved, particularly if the change dramatically increases the difference between adjacent increments, such as across zones.

After completing the temperature difference ratio series for the test process in a conveyorized thermal processor at conveyor speed $u_c$, the responding part temperature profile may be calculated for different control temperature profiles by a prediction process. The boundary conditions for the predicted process may be a new series of processor temperatures $T_z'$ and/or a new conveyor speed $u_c'$. A starting value of the part temperature defines the initial condition (generally at ambient conditions) as $T_p'(0)$, that is at $\iota$ equals zero. Then the predicted part temperature response at each subsequent interval may be determined from the relation in equation (6):

$$T_p'(\iota+1)=T_p'(\iota)+\{T_z'(\iota)-T_p'(\iota)\}R_t(\iota)R_s \quad (6)$$

If the new conveyor speed is identical to the test conveyor speed, the speed ratio is unity and can be ignored in the process part temperature relation. By starting this explicit marching calculation at ι equals zero, the entire response temperature series for the given control profile can be determined in what may be termed an AutoPredict™ process.

One major deficiency with the current thermal processor control is the absence of compensation for noncontrollable influence parameters, which may shift, for example, the processor ratio $R_z$ so that even when the control parameters are held fixed, the part is exposed to a thermal environment that may not be constant over time. Such complexities increase the control uncertainty that a particular control series, selected to provide a thermal environment that enables the part temperature response to conform to the specification, will indeed satisfy those conditions.

The Process Window Index, AutoPredict process and other past developments provide instruments to indicate specification compliance or anticipate whether such It condition may be expected with which to guide an operator. However, no direct method or mechanism is currently available to directly correlate this feedback and/or prediction information with which to directly adjust control parameter settings during or after one or more parts pass through a thermal processor. Such a development would greatly expedite the production of parts in a thermal processor by eliminating repeated testing of parts to adjust the control parameters once the thermal processor is characterized.

SUMMARY OF THE INVENTION

A method and apparatus for controlling the temperature response profile of a part being exposed to heating and/or cooling conditions in a thermal processor incorporates measured data from the part to adjust the thermal processor control settings by closed loop feedback.

DETAILED DESCRIPTION OF THE PREFERRED EMBODIMENTS

Those of ordinary skill in the art will realize that the following description of the present invention is illustrative only and not in any way limiting. Other embodiments of the invention will readily suggest themselves to such skilled persons after a perusal of the within disclosure.

In accordance with a presently preferred embodiment of the present invention, the components, process steps, and/or data structures may be implemented using various types of operating systems, computing platforms, computer programs, and/or general purpose machines. In addition, those of ordinary skill in the art will readily recognize that devices of a less general purpose nature, such as hardwired devices, or the like, may also be used without departing from the scope and spirit of the inventive concepts disclosed herewith.

The present invention is a method and apparatus to directly control the thermal processor by feedback of the part temperature profile. This may be accomplished by optimizing thermal response characteristics based on deviations from the control parameters set for the test process and then using the control parameters that correspond to the optimized response characteristics to adjust the control parameters while the part or a production series of parts travels through the thermal processor. The relationship between the control parameters and the part thermal response may be influenced by the processor environment—in particular how well the processor temperature profile conforms to the control temperature profile. The measured part temperature profile may be compared to its manufacturer's required specification, and by selecting control parameters based on optimized parameters, the part temperature profile can be made to conform to the specification so as to have the greatest margin of error so as to best compensate for fluctuations in the thermal processor responses to the control parameters.

In this disclosure, the term Process Window Index, S, may be used to describe an index value denominated in percentage of a "process window" for the maximum feedback parameter deviation from the specification tolerance. Similar index values ultimately used upon the same control parameters could also be used. Those of ordinary skill in the art will recognize therefore the term Process Window Index as used herein is intended to include similar indices, however denominated or limited by applicable range.

Figure 1:
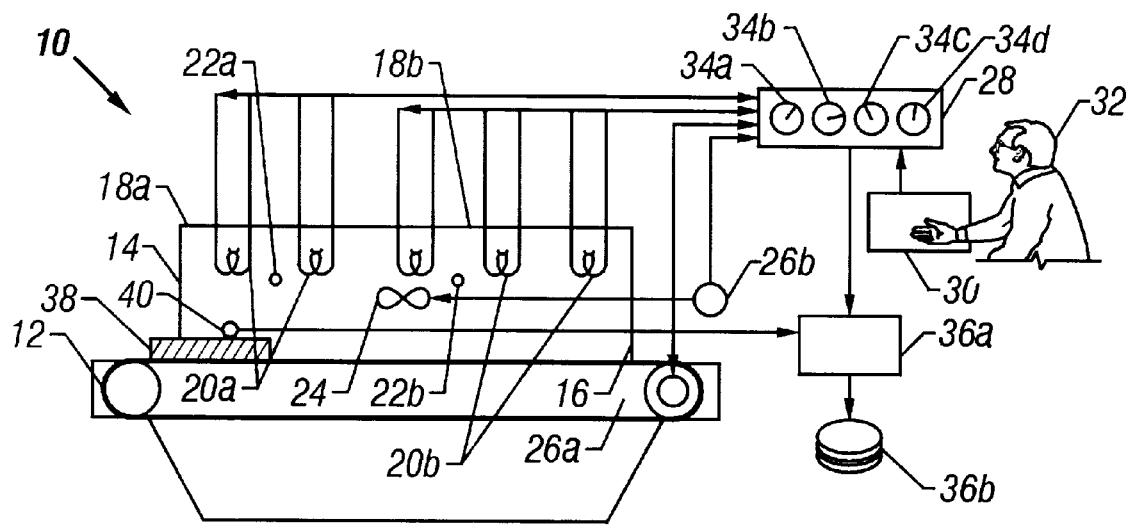
FIG. 1 is a side-view diagram of a conventional conveyorized reflow oven showing the different zones to which a item is exposed.
Figure 2:
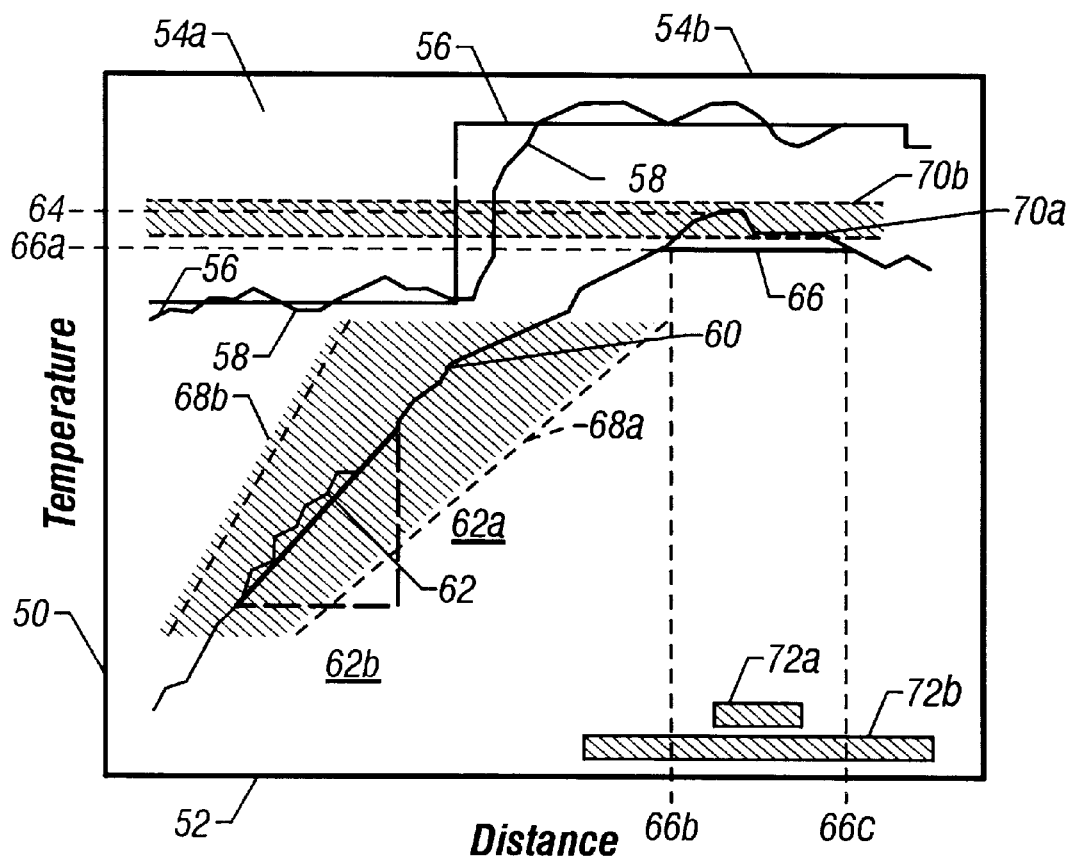
FIG. 2 is a graph showing temperature variations against distance along the thermal processor with example feedback parameters identified.
Figure 3:
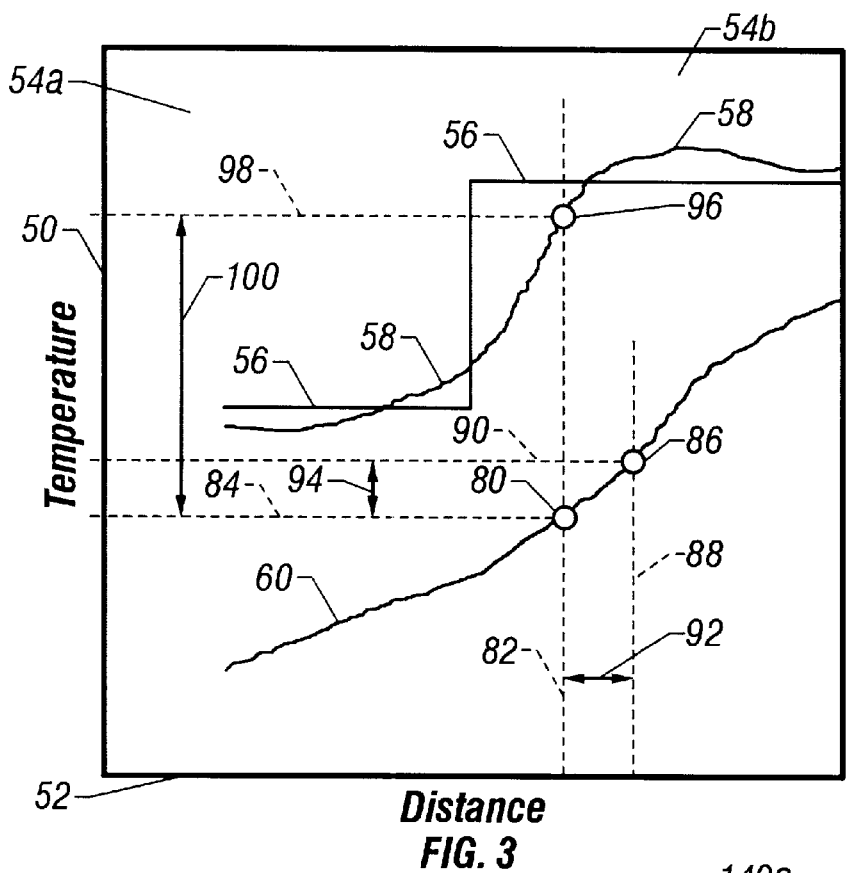
FIG. 3 is a graph showing temperature variations against distance along the thermal processor with example temperature values identified at specific intervals.
Figure 4:
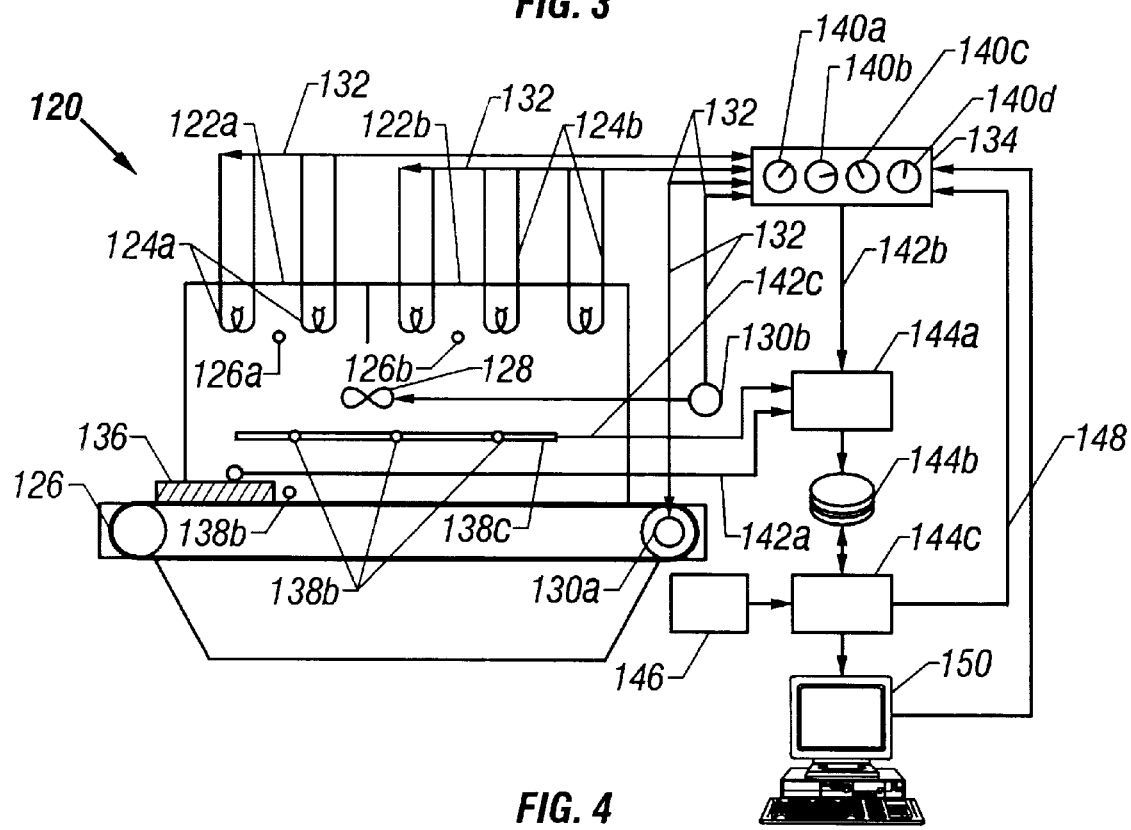
FIG. 4 is a side-view diagram of a conveyorized reflow oven according to a presently preferred embodiment of the present invention.

An apparatus performing the functions described above can be seen in the diagram of FIG. 4 for thermal processing. The thermal processor 120 depicted as a reflow oven has for this example two zones subject to control. The first zone 122a has heating elements 124a and a second zone 122b has heating elements 124b. In addition, the thermal processor has a conveyor 126 and a recirculating fan 128. The conveyor 126 may be powered by a conveyor motor 130a and the fan 128 by a fan motor 130b. The thermostat settings for heating elements 124a and 124b, and the speeds for conveyor motor 130a and fan motor 130b are commanded by a control connecting means 132 to input from a controller 134. A part 136 may be conveyed through the thermal processor 120 on the conveyor 126. The part 136 may be equipped with a temperature measurement device 138a for a test process. Alternatively, during a continuous or production process, such instrumentation may be unnecessary and not included. In addition, one or more temperature measurement devices 138b may be installed to monitor the processor thermal environment in the vicinity of the part 136. These temperature measurement devices 138b may be secured on the conveyor 126 or the part 136 so as not to be in thermal contact with any solid object. Alternatively, these part temperature measurement devices 138b may be integrated into a temperature measurement probe 138c intended to remain stationary within the thermal processor 120 during the test process. Such a temperature measurement probe 138c may dispose multiple temperature measurement devices 138b along a portion of the length of the thermal processor 120.

Each control parameter may be commanded to a target condition by the controller 134 at a control interface. The example shown in FIG. 4 features a first zone interface 140a, a second zone interface 140b, conveyor interface 140c and a fan control 140d. Temperature data from the part's measurement device 138a may be sent by feedback data connector 142a to a data acquisition system 144a. Temperature control data from the controller 134 may also be sent to the data acquisition system 144a by command data connector 142b. In addition, temperature data from the processor data connector 142c may also be sent to the data acquisition system 144a. The data are stored and produced in a data storage device 144b. The data are analyzed in a data processor 144c (which may be the same machine as data acquisition system 144a) to calculate feedback parameters from the part temperature data and compared to part response tolerance specifications provided from a source 146. The data processor 144c may also calculate the Process Window Index and find the minimum value based on the data collected. The data acquisition system 144a, the data storage and retrieval device 144b, the data processor 144c, or any combination thereof may be replaced by a multi-purpose device. The minimum Process Window Index may be correlated to an optimum set of control parameters in processor 144c and these revised control parameters may be provided to the controller by a command connector 148. Optionally, the control information may be provided to an operator through a console 150. The direct feedback from the calculated feedback parameters to the controller enables compensation for the effects from uncontrollable influence parameters.

Changes in the control parameters affect the calculated feedback parameters, and may thereby alter the Process Window Index value by either increasing the largest normalized deviation from the feedback parameter midpoint, or by changing another feedback parameter to produce a larger deviation than the previous maximum feedback deviation. It is possible to find relations between control parameters and feedback parameters by using "influence coefficients" that correlate change in the control parameters as independent variables to the change in feedback parameters as dependent variables. A control parameter that is adjusted based on the feedback parameters might use these influence coefficients as in a linear difference series or other normalized form for changes from a reference control parameter series as expressed in a linearized approximation expressed as equation (7):

$$B_i \approx B_i^0 + \Sigma_j a_{ij}(C_j - C_j^0)\} \forall i=1, \ldots, m; j=1, \ldots, n = B_i^0 + a_{i1}(C_1 - C_1^0) + a_{i2}(C_2 - C_2^0) + \ldots + a_{in}(C_n - C_n^0)\} \forall i=1, \ldots, m \quad (7)$$

where $B_i$ represent the feedback parameters ranging from a series ranging from i=1 to m, $C_j$ are the selected control parameters from a series ranging from j=1 to n, coefficients $a_{ij} = \partial B_i / \partial C_j$ as the first order derivative, ellipses are higher order terms, and superscript 0 denotes the reference conditions from which control changes are made. The feedback parameters can be approximated from the $a_{ij}$ coefficients.

The coefficients $a_{ij}$ as first order derivatives of calculated feedback parameters with respect to control parameters $C_j$ could be obtained by collecting a set of feedback values $B_i$ (i=1, 2, ..., m). As a simplified example, let the number of control parameters be n=4, the number of feedback parameters to be evaluated as m=3 for a reference and an adjusted set of conditions (or alternately, a first and second set of test conditions) of the control parameter to be varied. Control parameters might in this example correspond to first, control temperature for the first zone defined as $C_1 \equiv T_{c1}$; second, control temperature for the second zone defined as $C_2 \equiv T_{c2}$; third, conveyor speed $C_3 \equiv u$, and fourth, fan angular speed $C_4 \equiv \omega$. The corresponding feedback parameters for the two sets of test conditions provide the data with which to obtain the coefficients $a_{ij}$.

The difference in the peak part temperature (the third feedback parameter) may be computed between second and first fan speeds at reference first zone control temperatures, second zone control temperatures and so forth. The difference in the second and first fan speeds (the fourth control parameter) might be similarly computed. Dividing this third feedback difference with this fourth control difference, and dividing the total by the feedback tolerance band yields the influence coefficient between peak part temperature and fan speed—that is, for i=3 and j=4. Algebraically, determination of $a_{ij}$ may be expressed using superscript 0 for the reference condition in equation (8):

$$a_{ij} = (B_i - B_i^0)/(C_j - C_j^0) \quad (8)$$

in which for this example, i=3 and j=4. This process may be repeated for the third feedback parameter against each other change in control parameters, and for the other feedback parameters against control parameter changes. A table of coefficients $a_{ij}$ could thus be generated for all values of feedback parameters based on all values of control parameters. This table could be used for calculating the feedback parameters in the neighborhood of a particular point defined by a unique set of control parameters. This shortcut calculation would speed up the calculation of the Process Window Index near the particular point. After a suitable number of iterations in the subsequently mentioned algorithms, the process of which being a presently preferred embodiment of the invention, the values of $a_{ij}$ could be recalculated based on equation (7) to adjust the table for nonlinear variations in the feedback parameters as functions of the control parameters.

In order to adjust control parameters for the greatest margin of error, a minimum Process Window Index $S_{min}$ must be found for the available thermal processor ranges in control parameters such that the minimum Process Window Index is less than all other values of S and is less than one-hundred in percentage form. The control parameters directly affect thermal process in a reflow oven and alter the calculated feedback parameter responses and thereby influence the Process Window Index for a particular thermal process. Hence, the Process Window Index S may be represented as the maximum of all functions of the control parameters. This may be expressed in the relation form of equation (9):

$$S = \max\{f(C_j) \forall j=1, 2, \ldots, n\} = \max\{f(C_1), f(C_2), \ldots, f(C_n)\} \quad (9)$$

where the Process Window Index S represents the maximum value of the series of positive general functions $f$ for control parameters $C_j$ from j=1 to n. The set of control parameters evaluated represents a control series. Some of the functions $f(C_j)$, such as $C \equiv T_c$ may be proportional to the difference ratio $R_t$ used in the prediction for part temperature response.

Response in Process Window Index to changes in control parameters cannot be so easily characterized as the response in feedback parameters to control parameter changes. The Process Window Index being defined as a maximum value of a non-negative numerical set precludes a general assumption that a derivative of Process Window Index with a control parameter would be continuous. Changes in Process Window Index to control parameters may be characterized by discontinuous vector functions $g_j = f'(C_j) = \partial f / \partial C_j$ for j=1 to n. The influence characteristic vector $g_j$ corresponding to descending changes in Process Window Index provides the steepest gradient with which to search the minimum Process Window Index. In order to generate the values of control parameters that correspond to the minimum Process Window Index, a numerical optimization scheme may be employed to find the minimum value for the Process Window Index based on its variation with the corresponding control series.

Finding the minimum Process Window Index may not necessarily complete the task of identifying the optimum set of control parameters. If the change in control parameter values from the reference control series is large, any associated errors from approximations in the discontinuous gradients may result in a Process Window Index that does not conform to the expected minimum value. Generally, confidence that modest changes in several control parameters are preferable to large changes in only a few parameters. As a consequence, a weighting factor or bias may be assigned to a Process Window Index referred to as a "confidence coefficient" $\xi$ dependent on the extent of control parameter adjustment.

One example of a confidence coefficient might be related to a product of the normalized control parameter changes, such as $\xi = \Pi_j \{1+|C_j-C_j^o|/|C_j^o|\}^q$ for j=1 to n, wherein the confidence coefficient $\xi$ represents the product of the deviations from unity of normalized control parameters with q as a selected exponent with a value such as two. Such a confidence coefficient would typically be greater than or equal to unity, so that if $\xi$ is multiplied by a Process Window Index value S, the resulting Process Window Confidence Product S' would be at least as large as its corresponding Process Window Index S. In an operation wherein a predicted Process Window Index may be calculated from which to determine revised control parameters to be set in a thermal processor controller, the confidence coefficient would bias the predicted Process Window Index either towards or away from a required Process Window Index value that may not be exceeded. In an example, a first Process Window Index has a value of $S_1=70$, a second Process Window Index has a value of $S_2=80$, a first confidence coefficient is $\xi_1=1.5$, and a second confidence coefficient is $\xi_2=1.2$. Consequently, the first confidence product $S'_1=\xi_1 S_1=105$, while the second confidence product $S'_2=\xi_2 S_2=96$ being smaller than the first confidence product despite a larger second Process Window Index. Hence in this example, the second Process Window Index would be preferable over the first. Alternatively, the confidence coefficient could be an added bias term to the Process Window Index, rather than a factor in order to establish the minimum value. Other such relations to establish a confidence coefficient will readily suggest themselves to skilled persons in the art and remain within the scope of the present invention. In an it alternate embodiment of the present invention, the confidence product may be substituted for or multiplied by the predicted Process Window Index as the optimization criterion.

An alternative or additional factor to be considered in conjunction with the Process Window Index may be the centered capability ratio $C_{pk}$ as expressed above in equation (3). The inverse of the centered capability ratio might bias the predicted Process Window Index either towards or away from the required Process Window Index value. In an example, a first Process Window Index has a value of $S_1=96$, a second Process Window Index has a value of $S_2=84$, a first centered capability ratio is $C_{pk1}=1.6$, and a second centered capability ratio is $C_{pk2}=1.2$. Consequently, the first capability quotient $S''_1=S_1/C_{pk1}=60$, while the second capability quotient $S''_2=S_2/C_{pk2}=70$ being larger than the first capability quotient despite a smaller second Process Window Index. Hence in this example, the first Process Window Index would be preferable over the second. In an alternate embodiment of the present invention, the capability quotient may be substituted for or its inverse multiplied by the predicted Process Window Index as the optimization criterion.

In the preferred embodiment of the invention, the operator may have three optimization options from which to select with which to control the thermal processor: maximum process margin, maximum throughput, and minimum setup time. The first option of maximum process margin may provide the minimum or lowest predicted Process Window Index in order to attain the largest margin of part manufacturer tolerance satisfaction. Such a criterion may be selected for long-term continuous processing wherein drifting of process parameters may be anticipated. The second option of maximum throughput may provide the highest production throughput, which may be specified by establishing the highest conveyor speed and remain within a satisfactory Process Window Index. The third option of minimum setup time may provide the most rapid controller adjustment, which typically corresponds to the smallest adjustment to the control parameters available and nonetheless provide a satisfactory Process Window Index. In a multi-zone reflow oven, increasing temperature to an equilibrium value within a zone equipped with heating elements may be performed more rapidly than decreasing temperature within a zone equipped with cooling mechanisms. The minimum controller adjustment limits may therefore be biased with larger allowable variations for one direction of change than another.

Figure 5A:
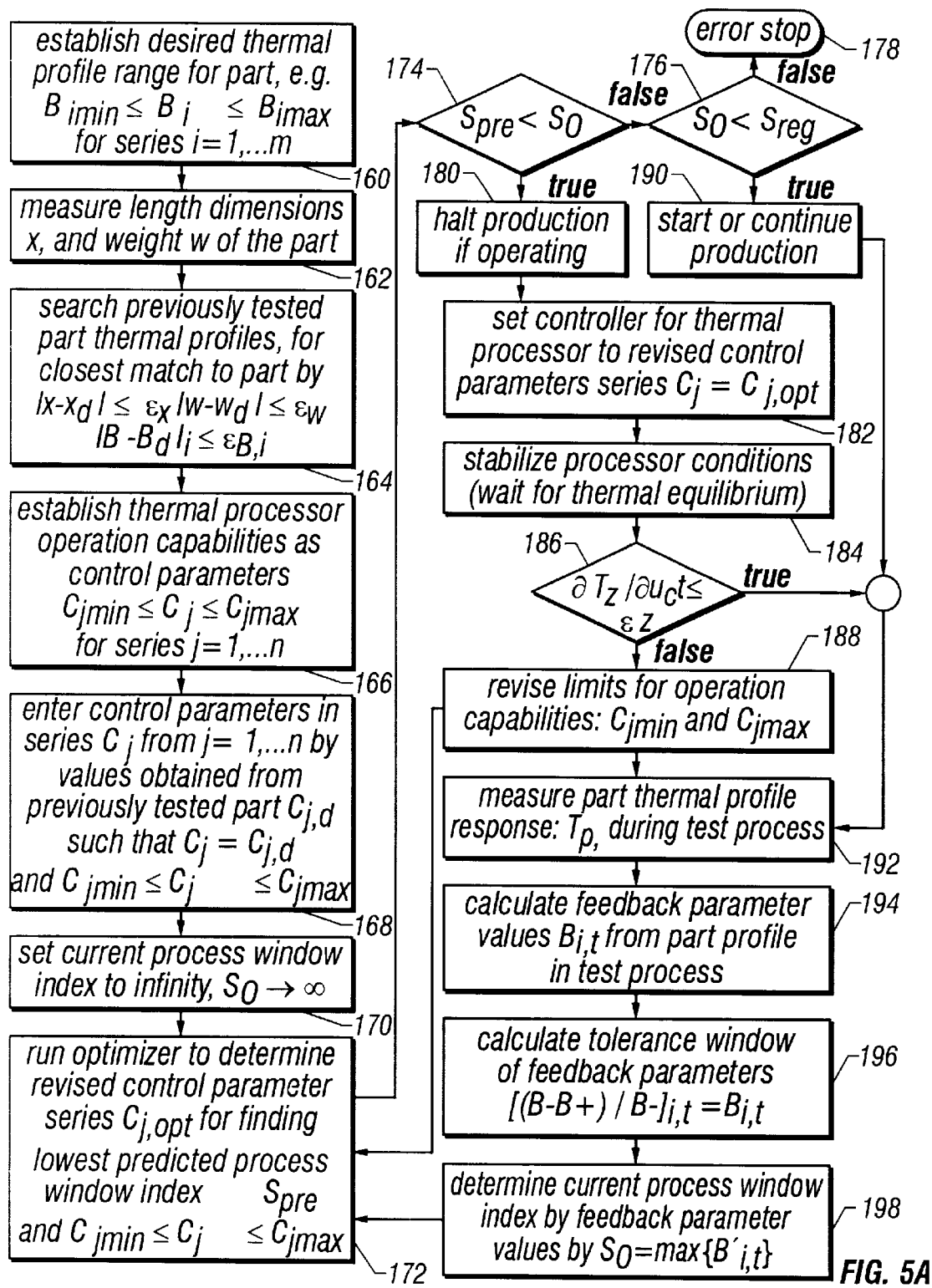
FIG. 5A is a flow-diagram of a procedure used to control a thermal processor in test process mode in accordance with a presently preferred embodiment of the present invention.

The procedure for establishing the thermal processor conditions to correspond to the optimal control parameters and operating the thermal processor using continuous or intermittent part temperature to monitor processor performance may be illustrated in the FIG. 5A flow diagram as one of the preferred embodiments of the present invention. The example provided corresponds to the first option of controlling the thermal processor based on minimum Process Window Index. The thermal process operation initiates by establishing the desired temperature profile range for a part's response 160. For example, for each feedback parameter $B_i$ in a series i=1, . . . , m, a range of $B_{imin}$ and $B_{imax}$ may be established or alternatively, a midpoint of the tolerance band $\beta^+_i$ and the band width $\beta^-_i$. The part response feedback ranges may be determined from a part manufacturer specification. The part to be exposed in the thermal processor may be weighed, to obtain weight w, and measured 162 for spatial dimensions x, from which surface area and volume may be calculated in the data processor. The database for previously tested parts may then be searched for a suitable example in database search 164, such as one in which the difference in particular spatial dimensions x and weight w are within an established set of database tolerances. This may be expressed as absolute differences such as $|x-x_d| \leq \epsilon_x$ for length and $|w-w_d| \leq \epsilon_w$ for weight. Alternatively, a database for part length and weight might be catalogued by a barcode whose identification may be scanned and entered into the data storage device. In addition, each of the feedback parameters $B_i$ may also be compared against the database, such as absolute difference $|B-B_d|_i \leq \epsilon_{B,i}$ within a series of acceptable feedback tolerances. The possible range for control parameters $C_j$ for a series j=1, . . . , n available for the thermal processor may be determined in the control limiter 166 for setting operational limits such as $C_{jmin} \leq C_j \leq C_{jmax}$.

The controller may enter the values of reference control parameters $C_j$ obtained from those obtained from the database values $C_{j,d}$ corresponding the feedback and dimensional tolerances of the part in the entry 168. The series of reference control parameters may be referred to as a reference control set. In addition, the control parameters may be compared to the limits available in the thermal processor. The current Process Window Index $S_0$ may be initially set to infinity (or another arbitrarily large number) 170, such that $S_0 \to \infty$. (As the part moves through the thermal processor and a part temperature profile is obtained through measured data, the current Process Window Index may be updated based on the measured data.) A current optimizer 172 may be executed to find an adjusted optimization parameter, which in this example represents the lowest predicted Process Window Index $S_{pre}$, and its corresponding revised series of control parameters within the constraints of the operational limits from the control limiter 166. The optimization execution may be referred to as a component of Auto-Predict™. The computational instrument calculating the current tolerance windows 196, and current Process Window Index values 198 and the lowest predicted Process Window Index values the current optimizer 172 may represent the same device.

The optimization execution may be summarized by varying the entered control parameters obtained from the database by incremental adjustments, calculating the corresponding adjusted optimization parameter based on thermal processor characterization, and repeating this operation until the adjusted optimization parameter cannot be further improved within a defined optimization tolerance resulting in a final adjusted optimization parameter, which may be referred to as a predicted optimization parameter. The adjusted control parameters corresponding to the predicted optimization parameter may be assigned to the revised control parameters. The series of revised control parameters may be referred to as a revised control set. For cases where the maximum process margin, as depicted in FIG. 5A in optimization 172, the lowest predicted Process Window Index represents the governing function on which the adjusted control parameters are calculated. In other cases, such as maximum throughput, the governing function might be the conveyor speed, and for minimum setup time, it might be the minimum variation in control parameters, such as the smaller the change in control parameter settings, the more quickly the thermal processor may stabilize so as to initiate production sooner than otherwise. Although typically the minimum predicted Process Window Index denotes the part temperature profile compliance with the specification, a more generic sense included for the predicted optimization parameter may be understood for the example described herein. In any event however, the current Process Window Index must satisfy the requirement to ensure that the part temperature profile may comply with the specification.

The lowest predicted Process Window Index $S_{pre}$ may then be compared to the current Process Window Index $S_0$ at a predicted-current comparison 174. If the lowest predicted Process Window Index is not less than the current Process Window Index, meaning no further improvement is possible such that $S_{pre} < S_0$ is FALSE, then the current Process Window Index $S_0$ may be compared to the maximum allowed or required Process Window Index $S_{req}$, which is typically set at one-hundred or slightly less (in percentage form) at a current-required comparison 176. If the current Process Window Index $S_0$ is not less than the required value, meaning $S_0 < S_{req}$ is FALSE, the operation may be terminated and an error message registered 178. In order to avoid unnecessary halts in operation when the Process Window Index improvement from the current optimization 172 would be small, the predicted-current comparison 174 may register FALSE for improvement upon obtaining a difference between current Process Window Index and predicted Process Window Index that falls within a window tolerance band, such that $S_0 - S_{pre} \leq \epsilon_S$.

If at the predicted-current comparison 174, the lowest predicted Process Window Index is less than the current Process Window Index, expressed as $S_{pre} < S_0$ being TRUE, then production of processing one or more parts may be commanded to halt 180 if that production has started earlier. The controller may be reset in controller command 182 for the thermal processor to the values for control parameters corresponding to the optimized Process Window Index such that $C_j = C_{j,opt}$. The thermal processor may be permitted sufficient time to stabilize time-averaged processor conditions (that are initially transient) for thermal equilibrium 184 within a control tolerance such that $|C-C'(t)|_j \leq \epsilon_{Cj}$ $(t \to \infty)$ where C' represents the measured temperature for the corresponding controlled element, not necessarily a process parameter relating to ambient temperature adjacent a part. Once control parameters are stabilized, the thermal processor's ability to satisfy controller settings (control parameter values specified into the controller) may be evaluated in a logic test for zone compliance 186, such as a satisfaction of a tolerance for interface temperature difference across zones. An example of this zone compliance condition may be expressed as $\partial T_z(t)/\partial(u_c t) \leq \epsilon_z$ in which the change in process temperature $T_z$ for each increment i with respect to distance denoted by conveyor speed $u_c$ multiplied by time t must be maintained within a particular zone interface tolerance $\epsilon_z$. This may also be expressed in a more general fashion by denoting a subset of processor parameters constituting measured temperature of the controlled elements $C'_j$ where $j=n'$, . . . , n" in which the range from n' to n" represents the process temperatures at consecutive zones. The zone compliance condition might be denoted as an absolute difference across zones being required not to exceed the zone interface tolerance, $|C'_{j+1} - C'_j| \leq \epsilon_z$, satisfaction of which may lead to measuring the part temperature profile in the test process 192 and thereby update the current Process Window Index. Failure of this zone compliance criterion may impose a logical detour of revising the operational limits of the thermal processor in a controller revision 188 and return to the current optimizer 172 to establish a revised lowest predicted Process Window Index $S_{pre}$ and the corresponding revised control parameters $C_{j,opt}$.

If the logical operand for the current Process Window Index being less than the required, that is $S_0 < S_{req}$, in the current-required comparison 176 is TRUE, the production of one or more parts in the thermal processor may start or continue 190, and the operation may transfer to measuring the part temperature $T_p$ profile response in the test process 192. If the zone interface tolerance not being exceeded is TRUE in the zone compliance 186, the operation may also transfer to test process 192. In a continuous measuring mode, unobtrusive remote sensors may be used rather than thermocouples mounted on the part. As mentioned above, if the zone interface tolerance is FALSE in the zone compliance 186, the operation may revise the control limits in the controller revision 188 and return to the current optimizer 172. Process feedback parameters from the test $B_{i,t}$ may be calculated from the measured part temperature profile, the corresponding feedback tolerance windows $B'_{i,t} = |(B_i - \beta^+_i)|/\beta^-_i$ may be calculated 196, the maximum of these windows corresponding to the current Process Window Index $S_0$ which may thus be updated 198 from equation (2). In order to provide continuity, the control parameters may be updated by returning to the current optimizer 172 until the thermal process has been completed for all parts to be conveyed through. If performance degradation of the thermal processor occurs, this continuous monitoring may enable a more rapid identification of processor parameter deviation from the control parameter, and thus result in much lower scrap of parts being thermally processed, leading to higher and more consistent yield.

Figures 1, 5B:
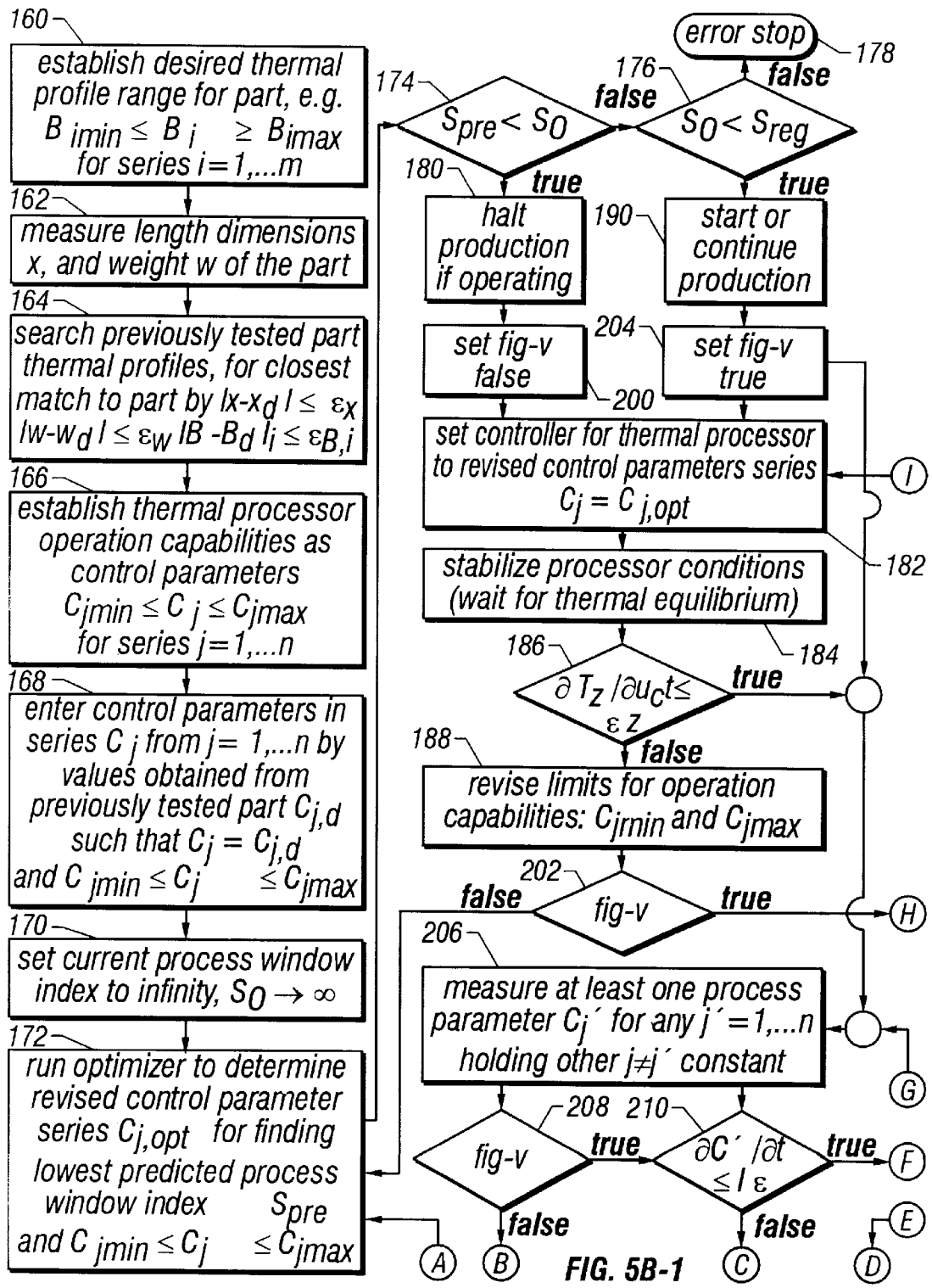
FIG. 5B is a flow-diagram of a procedure used to control a thermal processor in test process mode in accordance with a presently preferred embodiment of the present invention.
Figures 2, 5B:
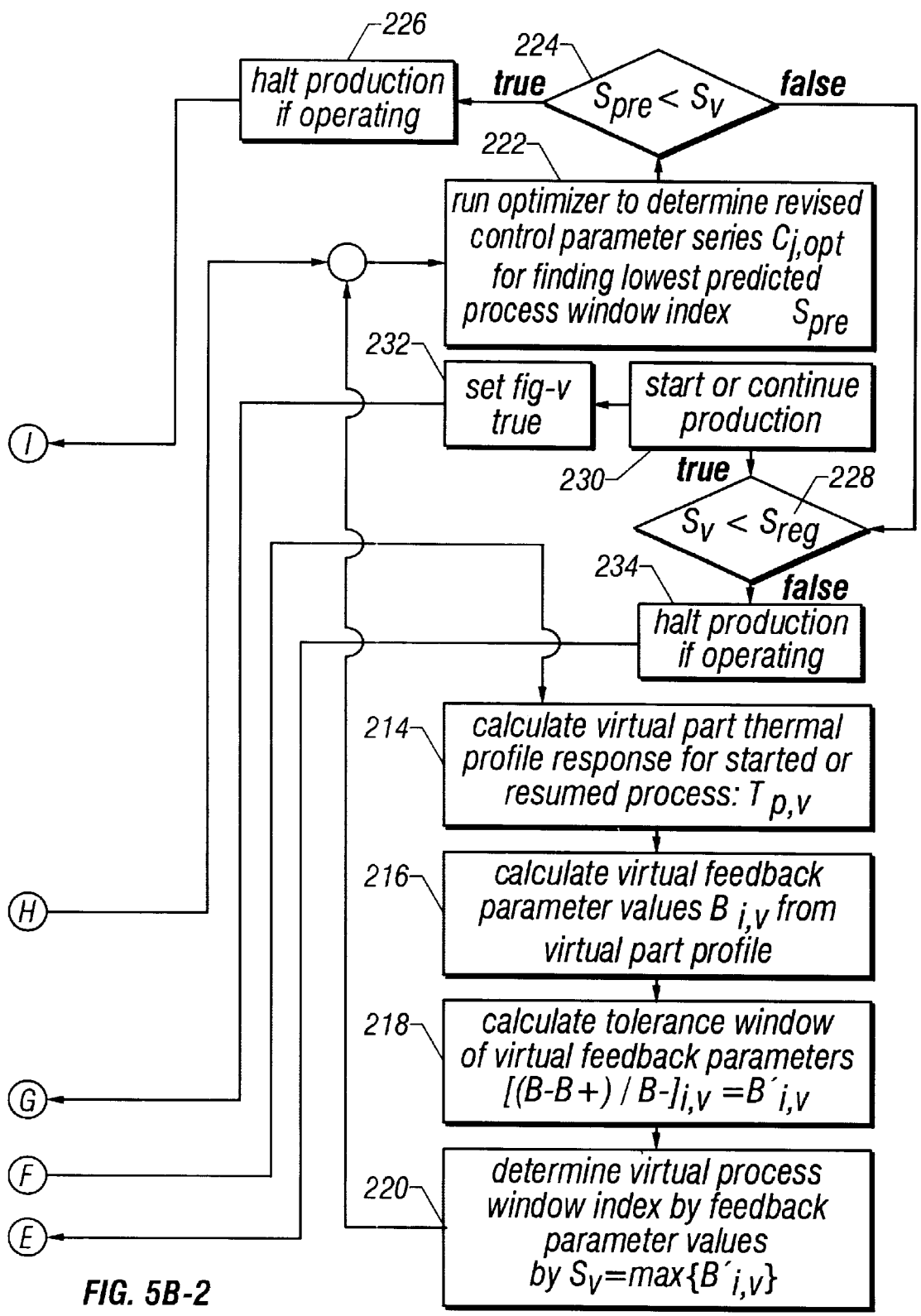
Figures 3, 5B:
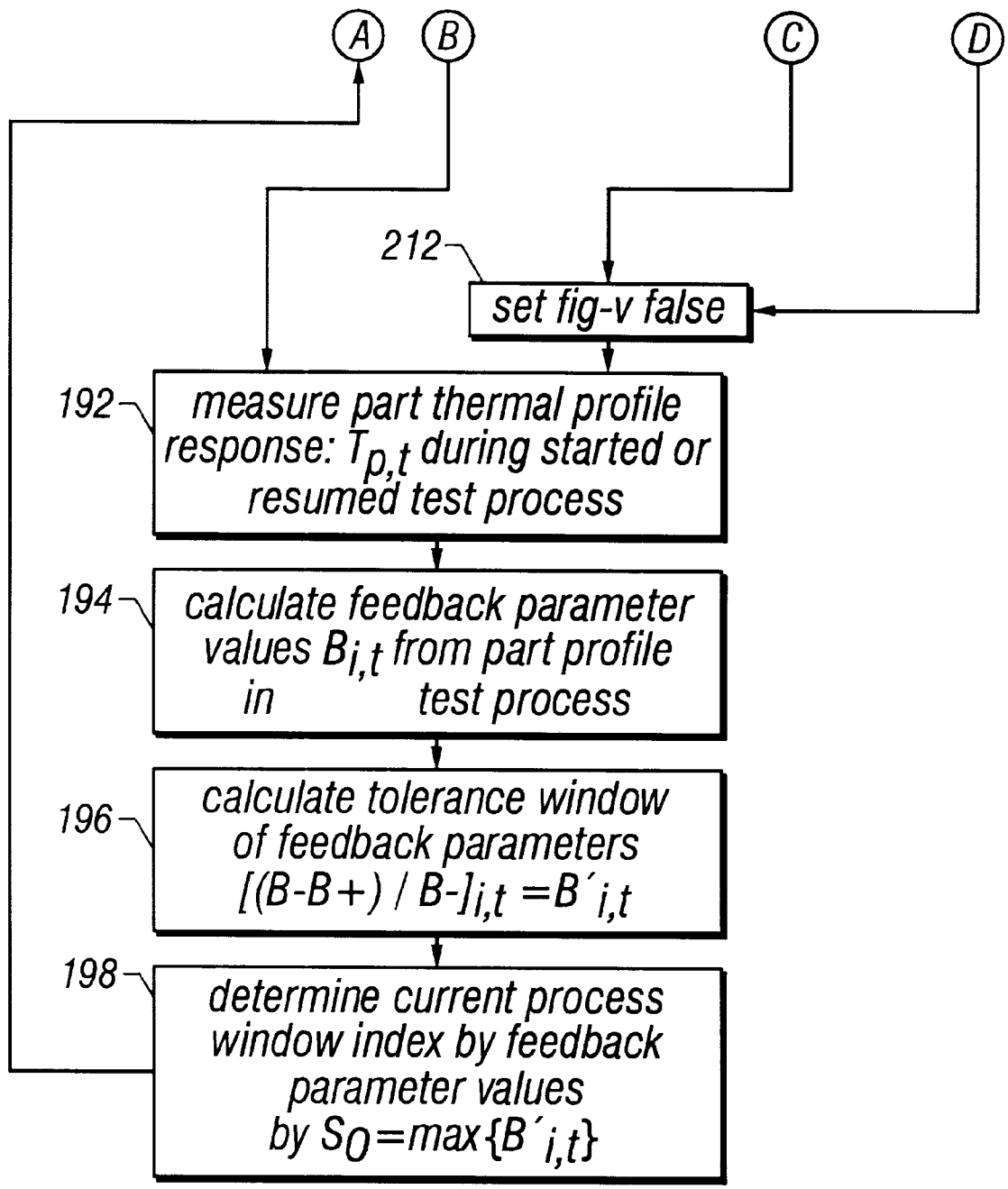

The procedure for establishing the thermal processor conditions to correspond to the optimal control parameters and operating the thermal processor using continuous processor parameter data (ambient temperature adjacent to the part) and intermittent part temperature to monitor processor performance may be illustrated in the FIG. 5B flow diagram as one of the preferred embodiments of the present invention. The item numbers in embodiment for FIG. 5A are repeated in FIG. 5B. The example provided corresponds to the first option of controlling the thermal processor based on minimum Process Window Index. The thermal process operation initiates by establishing the desired temperature profile range for a part's response 160. For example, for each feedback parameter $B_i$ in a series i=1, . . . , m, a range of $B_{imin}$ and $B_{imax}$ may be established or alternatively, a midpoint of the tolerance band $\beta^+{}_i$ and the band width $\beta^-{}_i$. The part response feedback ranges may be determined from a part manufacturer specification. The part to be exposed in the thermal processor may be weighed, to obtain weight w, and measured 162 for spatial dimensions x, with which surface area and volume may be calculated. The database for previously tested parts may then be searched for a suitable example in database search 164, such as one in which the difference in particular spatial dimensions x and weight w are within an established set of database tolerances. This may be expressed as absolute differences such as $|x-x_d| \leq \epsilon_x$ for length and $|w-w_d| \leq \epsilon_w$ for weight. In addition, each of the feedback parameters $B_i$ may also be compared against the database, such as absolute difference $|B-B_d|_{i \leq \epsilon B,i}$ within a series of acceptable feedback tolerances. The possible range for control parameters $C_j$ for a series j=1, . . . , n available for the thermal processor may be determined in the control limiter 166 for setting operational limits such as $C_{jmin} \leq C_j \leq C_{jmax}$.

The controller may enter the values of control parameters $C_j$ obtained from those obtained from the database values $C_{j,d}$ corresponding the feedback and dimensional tolerances of the part in the entry 168. The series of reference control parameters may be referred to as a reference control set. In addition, the control parameters may be compared to the limits available in the thermal processor. The current Process Window Index $S_0$ may be initially set to infinity (or another arbitrarily large number) 170, such that $S_0 \rightarrow \infty$. A current optimizer 172 may be executed to find the lowest predicted Process Window Index $S_{pre}$ and its corresponding revised series of control parameters within the constraints of the operational limits from the control limiter 166. The series of revised control parameters may be referred to as a revised control set. The optimization execution may be referred to as a component of Auto-Predict™. The computational instrument calculating the current tolerance windows 196, and current Process Window Index values 198 and the lowest predicted Process Window Index values the current optimizer 172 may represent the same device.

The lowest predicted Process Window Index $S_{pre}$ may then be compared to the current Process Window Index $S_0$ at a predicted-current comparison 174. If the lowest predicted Process Window Index is not less than the current Process Window Index, meaning $S_0 < S_{pre}$, is FALSE, then the current Process Window Index $S_0$ may be compared to the maximum allowed or required Process Window Index $S_{req}$, which is typically set at one-hundred (in percentage form) at a current-required comparison 176. If the current Process Window Index $S_0$ is not less than the required value, that is inquiry for $S_0 < S_{req}$ is FALSE, the operation may be terminated and an error message registered 178 in order for diagnostics to be performed on the thermal processor. In order to avoid unnecessary halts in operation when the Process Window Index improvement from the current optimization 172 would be small, the predicted-current comparison 174 may register FALSE for improvement upon obtaining a difference between current Process Window Index and predicted Process Window Index that falls within a window tolerance band, such that $S_0 - S_{pre} \leq \epsilon_s$.

If at the predicted-current comparison 174 the lowest predicted Process Window Index is less than the current Process Window Index, expressed as $S_{pre} < S_0$, then production of processing one or more parts may be halted 180 if that production has started. A logic flag denoting whether virtual profiling is to be performed flg-v may be set to FALSE 200. (If the default for flg-v is FALSE, this instruction would leave the flag setting unchanged.) The controller for the thermal processor may be reset in controller command 182 to the values for control parameters corresponding to the optimized Process Window Index such that $C_j = C_{j,opt}$. The thermal processor may be permitted sufficient time to stabilize time-averaged processor conditions (that are initially transient) for thermal equilibrium 184 within a control tolerance such that $|C-C'(t)|_j \leq \epsilon_{Cj}$ (t→∞) where C' represents the measured temperature for the corresponding controlled element, not necessarily a process parameter relating to ambient temperature adjacent a part. Once control parameters are stabilized, the thermal processor's ability to satisfy controller settings (control parameter values specified into the controller) may be evaluated in zone compliance 186, such as a interface tolerance across zones. An example of this zone compliance condition may be expressed as $\partial T_z(t)/\partial(u_c t) \leq \epsilon_z$ in which the change in process temperature $T_z$ for each increment ι with respect to distance denoted by conveyor speed $u_c$ multiplied by time t must be maintained within a particular zone interface tolerance $\epsilon_z$. Satisfaction of the zone compliance condition may lead to measuring the part temperature profile in the test process 192 and thereby update the current Process Window Index. Failure of this zone compliance criterion may impose a logical detour of revising the operational limits of the thermal processor in the controller revision 188. A logic inquiry on the virtual flag flg-v may be performed at a first flag check 202, with a FALSE indication transferring the operation to running the current optimizer 172 to compare with the current Process Window Index.

If the logical operand for the current Process Window Index being less than the required in the current-required comparison 176 is TRUE, the production of one or more parts in the thermal processor may start or continue in start command 190. Thereupon, the virtual flag flg-v may be set to TRUE 204, and the operation may transfer to measuring at least one processor parameter 206. If the logic operand for zone interface tolerance not being exceeded in zone compliance 186 is TRUE, the operation may also transfer to measuring a process parameter 206. In the continuous processor temperature measurement mode, then at least one processor parameter value $C'_j$ may be measured 206, assuming other process parameters $C'_{j'}$ are held constant, such that j≠j'. In order to take advantage of this part prediction feature, the process parameters $C'_j$ are preferably measured or otherwise determined on a continuous basis during the part's traverse through the thermal processor in operation. Alternately, if the thermal profile of the part can be established with sufficient accuracy, prediction of the part thermal profile for the virtual process may also be circumvented.

Following the operation of measuring a process parameter 206, the logical operand may inquire whether flg-v is TRUE or FALSE in the second flag check 208. If flg-v is TRUE (meaning virtual profiling), the operation continues to a logical operand in which temporal drift in the process parameter values may be evaluated in process drift comparison 210 as to whether a transient change remains within a zone transitory drift tolerance expressed as $\partial C'_j/\partial t \leq \epsilon_r$. Alternately, an increase in processor drift beyond tolerance may be detected by a decrease in the centered capability ratio. If the process drift comparison 210 indicates that satisfaction of the drift tolerance is TRUE, the virtual profile may be continued, using the processor parameters to determine whether the part temperature profile satisfies the specified criteria, described in more detail in subsequent paragraphs. If the process drift comparison 210 is FALSE, (meaning failure to satisfy drift tolerance) the flg-v logical operand may be set to FALSE 212.

If the flg-v is FALSE (meaning no virtual profiling), such as for the initial condition, either from the second flag check 208 or the setting instruction 212, the operation may transfer to measuring the part temperature $T_{p,t}$ during the test process 192. Test process feedback parameters $B_{i,t}$ may be calculated from the measured part temperature profile, the corresponding feedback tolerance windows $B'_{i,t}$ may be calculated 196, the maximum of these windows corresponding to the current Process Window Index $S_0$ which may thus be updated 198. In order to provide continuity, the control parameters may be updated by returning to the current optimizer 172 until the thermal process has been completed for all parts to be conveyed through.

If flg-v and processor drift tolerance satisfaction are both TRUE (second flag check 208 and process drift comparison 210), the operation proceeds to calculate the virtual response for the part temperature profile 214. The thermal profile of the part may then be calculated, without direct measurement means during the virtual process, in which the part temperature response and its corresponding virtual feedback parameters $B_i$ may be predicted based on the measured process parameters $C'_j$ as well as part dimensions x and weight w from measurement data taken in database search 164. The feedback parameters for the virtual process $B_{i,v}$ are calculated 216. The virtual tolerance window of these feedback parameters may be calculated 218 using the relation in equation (2) in which the window for each virtual feedback parameter may be expressed as $B'_{i,v}=|(B-\beta^+)/\beta^-|_{i,v}$. The virtual Process Window Index $S_v$ may be calculated in the virtual indexer 220 by finding the maximum virtual tolerance window value $B'_{i,v}$ for any i within the feedback parameter series. The virtual optimizer 222 may be used to update the lowest predicted Process Window Index $S_{pre}$ and its corresponding revised control parameters series $C_{j,opt}$. The series of revised control parameters may be referred to as a revised control set. Alternatively, virtual optimizer 222 may also be reached from the flg-v comparison at the first flag check 202 when that condition is TRUE, meaning virtual profiling may proceed. The computational instrument calculating the virtual part profile 214, virtual feedback parameters 216, virtual tolerance windows 218, and virtual process window index values in the virtual indexer 220, and the lowest predicted window in the virtual optimizer 222 may be the same device. The computational instrument used for calculation in the current optimizer 172 may represent the same device as for the virtual optimizer 222.

The lowest predicted Process Window Index may then be compared to the virtual Process Window Index in a comparative logical operand in predicted-virtual comparison 224 to determine whether the lowest predicted is less than the virtual, or $S_{pre}<S_v$. If that condition in predicted-virtual comparison 224 is TRUE (meaning the virtual profile may be improved), the operation may halt parts production 226 and return the operation to setting the controller in controller command 182 to the optimum (lowest predicted) control parameter values obtained from optimization in the virtual optimizer 222 and the operation may proceed as described above. If the predicted less than virtual condition in predicted-virtual comparison 224 is FALSE, the virtual Process Window Index may then be compared to the required Process Window Index in virtual-required comparison 228 to determine whether the virtual Process Window Index is less than the required, or $S_{v \leq Sreq}$. In order to avoid unnecessary interruption halts in operation when the Process Window Index improvement from the virtual optimizer 222 would be small, the predicted-virtual comparison 224 may register FALSE for improvement upon obtaining a difference between virtual Process Window Index and lowest predicted Process Window Index that falls within a window tolerance band, such that $S_v-S_{pre} \leq \epsilon_S$.

If the requirement condition in virtual-required comparison 228 is TRUE, the operation may start or continue part production 230 and set flg-v to TRUE 232, followed by a return to measuring a process parameter 206. If that requirement condition in virtual-required comparison 228 is FALSE, the production may be halted if operating 234 and the operation returned to setting fig-v to FALSE 212 from which the operation proceeds to measuring the part temperature profile in the test process 192. If performance degradation of the thermal processor occurs, this continuous monitoring may enable a more rapid identification of processor parameter deviation from the control parameter, and thus result in much lower scrap of parts being thermally processed, leading to higher and more consistent yield.

In summary of the logical operands, if the current Process Window Index $S_0$ is neither greater than the lowest predicted Process Window Index value $S_{pre}$ nor less than the required $S_{req}$, the thermal processor operation may be terminated and an error message may be registered to the operator. If the lowest predicted Process Window Index $S_{pre}$ is less than the current value $S_0$, the revised control parameter conditions $C_{jopt}$ may be established to adjust the controller. If the current or virtual Process Window Index is not less than the lowest predicted value, but is less than the required value, the test process involving monitoring the processor parameters and the feedback parameters may be performed or continued.

The second and third options for the operator may be similarly expressed in the FIGS. 5A and 5B flowcharts by substituting the criterion of lowest predicted Process Window Index in current optimizer 172 and virtual optimizer 222. The operations therein may incorporate maximum or otherwise fixed conveyor speed $u_c$ for the second option, and minimum control adjustment for the third option. The revised control it parameters would be established in the same manner as described above except for the criterion used to calculate their values.

The adjustment in control parameters from those established to the optimum values may be calculated as an absolute value labeled $\Delta C_j=|C_{jopt}-C_j|$ as mentioned for the third option for the operator. A logical interrogative may be performed to It determine whether (a) the adjustment difference is zero or $\Delta C_j=0$, indicating no change in control parameters is required, (b) the adjustment difference is between zero and a physical control parameter limit $0<\Delta C_j \leq \Delta C_{jlim}$, and (c) the adjustment difference exceeds the physical control parameter limit $\Delta C_j > \Delta C_{jlim}$. If a control adjustment difference exceeds its limit, the operation may be terminated and the thermal processor may be shut down. If the adjustment difference falls between zero and the limit, the control parameters are reset to the optimum values for optimal compliance with the feedback tolerance. If no adjustment is required (zero difference), then the reset function may be bypassed. The following step involves activation or maintenance of the controller settings for the thermal processor. The control parameters may be permitted to reach equilibrium, leading to the production process of parts through the thermal processor, which in a closed-loop system continues the monitoring of the process parameters.

The methodology for directly adjusting the controller based on the optimization performed to obtain revised control parameters may be incorporated and executed in coded form on a variety of computational and/or storage media intended for such purposes. The revised control parameters may be determined from finding the minimum Process Window Index value or from a part temperature profile predictor, both based on measured temperature data. The corresponding apparatus provides the functionality of collecting measured temperature data, calculating the margin (if any) by which the thermal process satisfies the specification requirements using the Process Window Index, finding the minimum or otherwise most appropriate Process Window Index, establishing their corresponding revised control parameter values, and incorporating these values into the controller for optimized thermal processing in an automated process after deciding the optimization criterion. The direct control method and corresponding functional apparatus alleviates the operator from control adjustment, whether or not the control parameters initially selected corresponded to a satisfactory thermal process, that may be in conformance with the manufacturer's specification. As a consequence, this control adjustment using feedback parameters from the part enables complete closed loop automation of the thermal process.

While embodiments and applications of the invention have been shown and described, it would be apparent to those of ordinary skill in the art, after a perusal of the within disclosure, that many more modifications than mentioned above are possible without departing from the inventive concepts herein. The invention, therefore, is not to be restricted except in the spirit of the appended claims.

What is claimed is:

1. A method for controlling a thermal processor, said method comprising:
    establishing at least one desired part thermal profile range for a part;
    measuring a part weight and a part length in at least one direction of said part;
    determining a plurality of control ranges for the thermal processor;
    selecting a reference plurality of control parameters that conform to said plurality of control ranges and correspond to said at least one desired part thermal profile range, said part weight and said part length each within a defined tolerance;
    running an optimizer to calculate a revised plurality of control parameters from a predicted Process Window Index;
    comparing a current Process Window Index to said predicted Process Window Index and a required Process Window Index to instruct controller one of either to start or halt production as a command, wherein said current Process Window Index is initially set to a large chosen number;
    setting a thermal controller to said revised plurality of control parameters;
    verifying that said revised plurality of control parameters are attained in the thermal processor after a plurality of processor parameters reach equilibrium;
    measuring a part temperature of said part;
    revising said current Process Window Index from said measured part temperature; and
    repeating in sequence said running, comparing, setting, measuring and revising while said part is in thermal processor.

2. A method according to claim 1 wherein running an optimizer further includes:
    calculating a predicted Process Window Index from at least one of maximum process margin, maximum throughput, and minimum setup time.

3. A method according to claim 1 wherein running an optimizer further comprises:
    adjusting at least one of a plurality of control parameters by a defined increment to produce an adjusted control set, said adjusted control set further comprising an adjusted plurality of control parameters;
    calculating an adjusted optimization parameter from said adjusted control set;
    repeating said adjusting and calculating operations until said adjusted optimization parameter cannot be improved within an optimization tolerance yielding a final adjusted optimization parameter;
    determining a predicted optimization parameter which corresponds to said final adjusted optimization parameter;
    establishing an optimum control set from said plurality of adjusted control sets, said optimum control set corresponding to said predicted optimization parameter;
    calculating a predicted Process Window Index from said optimum control set; and
    assigning said optimum control set as a revised plurality of control parameters.

4. A method according to claim 3 wherein calculating a plurality of revised control parameters further comprises:
    multiplying said adjusted Process Window Index by a weighting coefficient based on a set of differences between an adjusted control set and said reference control set.

5. A method according to claim 3 wherein said adjusted optimization parameter may be selected from at least one of a minimum Process Window Index for maximum process margin, a maximum conveyor speed for maximum throughput, and a minimum difference between revised control parameters and reference control parameters for minimum setup time.

6. A method according to claim 5 wherein finding a minimum Process Window Index further comprises:
    identifying the minimum value from a plurality of adjusted Process Window Index values.

7. A method according to claim 5 wherein finding a maximum conveyor speed further comprises:
    identifying the maximum value from a plurality of conveyor speeds.

8. A method according to claim 5 wherein finding a minimum difference between revised control parameters and reference control parameters further comprises:

identifying the minimum absolute value from a plurality of differences between revised control parameters and reference control parameters.

9. A method according to claim 1 wherein revising said current Process Window Index further comprises:
calculating a plurality of feedback parameters from said measured part temperature;
calculating a plurality of tolerance windows from said plurality of feedback parameters; and
assigning the maximum value from said plurality of tolerance windows to said current Process Window Index.

10. A method for controlling a thermal processor, said method comprising:
establishing at least one desired part thermal profile range for a part;
measuring a part weight and a part length in at least one direction of said part;
determining a plurality of control ranges for the thermal processor;
selecting a reference plurality of control parameters that conform to said plurality of control ranges and correspond to said at least one desired part thermal profile range, said part weight and said part length each within a defined tolerance;
first running an optimizer to calculate a revised plurality of control parameters from a predicted Process Window Index;
first comparing a current Process Window Index to said predicted Process Window Index and a required Process Window Index to instruct controller one of either to start or halt production as a first command, wherein said current Process Window Index is initially set to a large chosen number;
setting a thermal controller to said revised plurality of control parameters;
first verifying that said revised plurality of control parameters are attained in the thermal processor after a plurality of processor parameters reach equilibrium;
first measuring a part temperature of said part;
revising said current Process Window Index from said measured part temperature;
first repeating in sequence said first running, first comparing, setting, first measuring and revising operations until said current Process Window Index satisfies said required Process Window Index;
second measuring at least one process parameter;
second verifying that a variation in said at least one process parameter with time is within a drift tolerance;
calculating a virtual Process Window Index from a predicted virtual part temperature;
second running said optimizer to calculate a revised plurality of control parameters
from a predicted Process Window Index;
second comparing said virtual Process Window Index to said predicted Process Window Index and a required Process Window Index to instruct controller one of either to start or halt production as a second command; and
second repeating in sequence said second measuring, second verifying, calculating, second running and second comparing while said part is in thermal processor.

11. A method according to claim 10 wherein said second comparing operation for said second command being halt production, when said virtual Process Window Index is less than said predicted Process Window Index, further includes:
control-setting said thermal controller to said revised plurality of control parameters; and
waiting until said plurality of processor parameters have reached thermal equilibrium.

12. A method according to claim 10 wherein said second comparing operation for said second command being halt production, when said virtual Process Window Index is not less than said required Process Window Index, further includes:
first measuring said measured part temperature;
revising said current Process Window Index from said measured part temperature; and
first repeating in sequence said first running, first comparing, control setting, first measuring and revising operations until said current Process Window Index satisfies said required Process Window Index.

13. A method according to claim 10 wherein second measuring further includes:
holding said plurality of process parameters constant not including said at least one process parameters.

14. A method according to claim 10 further comprising:
creating a virtual flag that may be set to one of either a first logical state or a second logical state for deciding if a virtual part temperature is to be calculated when said virtual flag is said first logical state or to be measured when said virtual flag is said second logical state;
setting said virtual flag to said second logical state if a difference between said current Process Window Index and predicted Process Window Index is greater than a window tolerance;
setting said virtual flag to said first logical state if said current Process Window Index is less than said required Process Window Index;
setting said virtual flag to said second logical state if said plurality of process parameters do not satisfy said drift tolerance; and
setting said virtual flag to said first logical state if said virtual Process Window Index is less than said required Process Window Index.

15. A method according to claim 14 further comprising:
revising said control parameter limits if zone compliance with zone tolerance is said second logical state;
first running optimizer if said virtual flag is said second logical state; and
second running optimizer if said virtual flag is said second logical state.

16. A method according to claim 10 wherein setting a plurality of control parameters further comprises:
calculating at least one part temperature response profile to a selected control set to produce a predicted part temperature response;
determining whether said predicted part temperature response profile satisfies a part specification; and
comparing said selected control set to a plurality of control capability limits.

17. A method according to claim 10 wherein calculating a plurality of revised control parameters further comprises:
adjusting a plurality of control parameters to produce an adjusted control set;
calculating a plurality of response Process Window Index values from a plurality of adjusted control sets;
finding a minimum Process Window Index value from said plurality of Process Window Index values;

establishing a revised control set from said plurality of adjusted control set, said revised control set corresponding to said minimum Process Window Index value; and assigning said revised control set as a revised plurality of control parameters.

18. A method according to claim 10 wherein calculating a plurality of revised control parameters further comprises:

multiplying said adjusted Process Window Index by a weighting coefficient based on a set of differences between an adjusted control set and said reference control set.

19. A method according to claim 18 wherein calculating a revised plurality of control parameters further comprises:

satisfying a condition from at least one of a minimum Process Window Index, a maximum conveyor speed, and a minimum difference between said plurality of revised control parameters and an existing plurality of control parameters, wherein said existing plurality of control parameters is taken from at least one of said plurality of reference control parameters and a prior plurality of revised control parameters; and calculating a Process Window Index that satisfies a required Process Window Index.

20. A method according to claim 10 wherein said first running optimizer and said second running optimizer operations may be performed by the same device.

21. A programmable storage device readable by a machine tangibly embodying a program of instructions executable by the machine to perform method steps for controlling a thermal processor having a control series from a plurality of control parameters, said method steps comprising:

establishing at least one desired part thermal profile range for a part;

measuring a part weight and a part length in at least one direction of said part;

determining a plurality of control ranges for the thermal processor;

selecting a reference plurality of control parameters that conform to said plurality of control ranges and correspond to said at least one desired part thermal profile range, said part weight and said part length each within a defined tolerance;

running an optimizer to calculate a revised plurality of control parameters from a predicted Process Window Index;

comparing a current Process Window Index to said predicted Process Window Index and a required Process Window Index to instruct controller one of either to start or halt production as a command, wherein said current Process Window Index is initially set to a large chosen number;

setting a thermal controller to said revised plurality of control parameters;

verifying that said revised plurality of control parameters are attained in the thermal processor after a plurality of thermal processor parameters reach thermal equilibrium;

measuring a part temperature;

revising said current Process Window Index from said measured part temperature; and repeating in sequence said running, comparing, setting, measuring and revising while said part is in thermal processor.

22. A programmable storage device according to claim 21 wherein running an optimizer further includes:

calculating a predicted Process Window Index selected from at least one of maximum process margin, maximum throughput, and minimum setup time.

23. A programmable storage device according to claim 21 wherein running an optimizer further comprises:

adjusting at least one of a plurality of control parameters by a defined increment to produce an adjusted control set, said adjusted control set further comprising an adjusted plurality of control parameters;

calculating an adjusted optimization parameter from said adjusted control set;

repeating said adjusting and calculating operations until said adjusted optimization parameter cannot be improved within an optimization tolerance yielding a final adjusted optimization parameter;

determining a predicted optimization parameter which corresponds to said final adjusted optimization parameter;

establishing an optimum control set from said plurality of adjusted control sets, said optimum control set corresponding to said predicted optimization parameter;

calculating a predicted Process Window Index from said optimum control set; and assigning said optimum control set as a revised plurality of control parameters.

24. A programmable storage device according to claim 23 wherein calculating a plurality of revised control parameters further comprises:

multiplying said adjusted Process Window Index by a weighting coefficient based on a set of differences between an adjusted control set and said reference control set.

25. A programmable storage device according to claim 23 wherein said adjusted optimization parameter may be selected from at least one of a minimum Process Window Index for maximum process margin, a maximum conveyor speed for maximum throughput, and a minimum difference between revised control parameters and reference control parameters for minimum setup time.

26. A programmable storage device readable by a machine tangibly embodying a program of instructions executable by the machine to perform method steps for controlling a thermal processor having a control series from a plurality of control parameters, said method steps comprising:

establishing at least one desired part thermal profile range for a part;

measuring a part weight and a part length in at least one direction of said part;

determining a plurality of control ranges for the thermal processor;

selecting a reference plurality of control parameters that conform to said plurality of control ranges and correspond to said at least one desired part thermal profile range, said part weight and said part length each within a defined tolerance;

first running an optimizer to calculate a revised plurality of control parameters from a predicted Process Window Index;

first comparing a current Process Window Index to said predicted Process Window Index and a required Process Window Index to instruct controller one of either to start or halt production as a first command, wherein said current Process Window Index is initially set to a large chosen number;

setting a thermal controller to said revised plurality of control parameters;

first verifying that said revised plurality of control parameters are attained in the thermal processor after a plurality of processor parameters reach thermal equilibrium;

first measuring a part temperature;

revising said current Process Window Index from said measured part temperature;

first repeating in sequence said first running, first comparing, setting, first measuring and revising operations until said current Process Window Index satisfies said required Process Window Index;

second measuring at least one process parameter;

second verifying that a variation in said at least one process parameter with time is within a drift tolerance;

predicting a virtual part temperature;

calculating a virtual Process Window Index from said virtual part temperature;

second running said optimizer to calculate a revised plurality of control parameters from a predicted Process Window Index;

second comparing said virtual Process Window Index to said predicted Process Window Index and a required Process Window Index to instruct controller one of either to start or halt production as a second command; and second repeating in sequence second measuring, second verifying, calculating, second running and second comparing while said part is in thermal processor.

27. A method according to claim 26 wherein said second comparing operation for said second command being halt production, when said virtual Process Window Index is less than said predicted Process Window Index, further includes:

setting said thermal controller to said revised plurality of control parameters; and waiting until said plurality of processor parameters have reached thermal equilibrium.

28. A programmable storage device according to claim 26 wherein said second comparing operation for said second command being halt production, when said virtual Process Window Index is not less than said required Process Window Index, further includes:

first measuring said measured part temperature;

revising said current Process Window Index from said measured part temperature; and first repeating in sequence said first running, first comparing, setting, first measuring and revising operations until said current Process Window Index satisfies said required Process Window Index.

29. A programmable storage device according to claim 26 wherein said second measuring further includes:

holding said plurality of process parameters constant not including said at least one process parameters.

30. A programmable storage device according to claim 26 further comprising:

creating a virtual flag that may be set to one of either a first logical state or a second logical state for deciding if a virtual part temperature is to be calculated when said virtual flag is said first logical state or to be measured when said virtual flag is said second logical state;

setting said virtual flag to said second logical state if a difference between said current Process Window Index and predicted Process Window Index is greater than a window tolerance;

setting said virtual flag to said first logical state; if said current Process Window Index is less than said required Process Window Index;

setting said virtual flag to said second logical state if said plurality of process parameters do not satisfy said drift tolerance; and setting said virtual flag to said first logical state; if said virtual Process Window Index is less than said required Process Window Index.

31. A programmable storage device according to claim 30 further comprising:

revising said control parameter limits if zone compliance with zone tolerance is said second logical state;

first running optimizer if said virtual flag is said second logical state; and second running optimizer if said virtual flag is said first logical state.

32. A programmable storage device according to claim 26 wherein setting a plurality of control parameters further comprises:

calculating at least one part temperature response profile to a selected control set to produce a predicted part temperature response;

determining whether said predicted part temperature response profile satisfies a part specification; and comparing said selected control set to a plurality of control capability limits.

33. A programmable storage device according to claim 26 wherein calculating a plurality of revised control parameters further comprises:

adjusting a plurality of control parameters to produce an adjusted control set;

calculating a plurality of response Process Window Index values from a plurality of adjusted control sets;

finding a minimum Process Window Index value from said plurality of Process Window Index values;

establishing a revised control set from said plurality of adjusted control set, said revised control set corresponding to said minimum Process Window Index value; and assigning said revised control set as a revised plurality of control parameters.

34. An apparatus for controlling a thermal processor, said apparatus comprising:

a processor controller for setting a plurality of control parameters;

a data recorder for recording measured data or calculated data from a part and from the thermal processor;

a required part thermal profile, said part thermal profile being recorded in said data recorder;

a scale for measuring a weight of said part, said weight being recorded in said data recorder;

a ruler for measuring at least one length of said part, said at least one length being recorded in said data recorder;

a conveyor for moving said part into and through the thermal processor;

a first database of a plurality of measured part thermal profiles, said first database being recorded in said data recorder;

a second database of a plurality of thermal processor operation capabilities, said second database being recorded in said data recorder;

a first data processor for calculating a plurality of reference control parameters for producing a reference control set, said first data processor being connected to said data recorder, said reference control set being constrained by said second database;

a second data processor for optimizing an optimization parameter and determine a plurality of revised control parameters to produce a revised control set, said second data processor being connected to said first processor and said data recorder, said optimization parameter yielding a predicted Process Window Index;

a third data processor for comparing a current Process Window Index to said predicted Process Window Index and to a required Process Window Index, said third data processor being connected to said second data processor and said data recorder;

a production controller for signaling a part loader to stop or start loading said part on said conveyor, said production controller being connected to said processor controller;

a control input device for setting said processor controller to said revised control set;

a control connector for commanding a plurality of control elements, wherein said control connector is connected to said processor controller, said plurality of control elements, said control input device, and said second data processor, and said plurality of control elements is selected from at least one of at least one heater, at least one cooler, at least one motor, at least one fan, at least one conveyor and at least one parts loader;

a fourth data processor for determining whether a plurality of measured values from said plurality of control elements conform to said revised control set, said fourth data processor connected to said second data processor;

a part temperature instrument for measuring a part temperature, said part temperature instrument being connected to said data recorder;

a fifth data processor for calculating a replacement value for said current Process Window Index from said part temperature, said fifth data processor connected to said data recorder; and a data connector for connecting said data recorder, said first data processor, said second data processor, said third data processor, said fourth data processor, said fifth data processor and said part temperature instrument.

35. An apparatus according to claim 34 wherein said first data processor, said second data processor, said third data processor, said fourth data processor, said fifth data processor, or any combination thereof, are replaced by a multi-purpose device.

36. An apparatus according to claim 34 wherein said second data processor for calculating said plurality of revised control parameters further includes:

a condition from at least one of a minimum Process Window Index, a maximum conveyor speed, and a minimum difference between said reference plurality of control parameters and said plurality of revised control parameters; and a current Process Window Index that satisfies a required Process Window Index.

37. An apparatus according to claim 34 wherein said second data processor for revising said current Process Window Index further includes:

a plurality of feedback parameters measured from said measured part temperature;

a plurality of tolerance windows calculated from said plurality of feedback parameters; and a maximum value from said plurality of tolerance windows assigned to said current Process Window Index.

38. An apparatus for controlling a thermal processor, said apparatus comprising:

a processor controller for setting a plurality of control parameters;

a data recorder for recording measured data or calculated data from a part and from the thermal processor;

a required part thermal profile, said part thermal profile being recorded in said data recorder;

a scale for measuring a weight of said part, said weight being recorded in said data recorder;

a ruler for measuring at least one length of said part, said at least one length being recorded in said data recorder;

a conveyor for moving said part into and through the thermal processor;

a first database of a plurality of measured part thermal profiles, said first database being recorded in said data recorder;

a second database of a plurality of thermal processor operation capabilities, said second database being recorded in said data recorder;

a first data processor for calculating a plurality of reference control parameters to produce a reference control set, said first data processor being connected to said data recorder, said reference control set being constrained by said second database;

a second data processor for optimizing a current optimization parameter and determine a plurality of current revised control parameters to produce a current revised control set, said second data processor being connected to said first processor and said data recorder, said optimization parameter yielding a first predicted Process Window Index;

a third data processor for comparing a current Process Window Index to said first predicted Process Window Index and to a required Process Window Index, said third data processor being connected to said second data processor and said data recorder;

a production controller for signaling a part loader to stop or start loading said part on said conveyor, said production controller being connected to said processor controller;

a first control input device for setting said processor controller to said current revised control set;

a fourth data processor for determining whether a plurality of measured values from said plurality of control elements conform to said revised control set, said fourth data processor connected to said second data processor and to said data recorder;

a processor temperature instrument in at least one location in the thermal processor for measuring a processor temperature, said processor temperature instrument being connected to said data recorder;

a part temperature instrument for measuring a measured part temperature, said measured part temperature instrument being connected to said data recorder;

a fifth data processor for calculating a replacement value for said current Process Window Index from said part temperature, said fifth data processor connected to said data recorder;

a sixth data processor for calculating whether variation with time of said processor temperature exceeds a drift tolerance, said sixth data processor connected to said data recorder;

a seventh data processor for calculating a virtual part temperature based on said revised control set and a virtual Process Window Index from said virtual part temperature, said seventh data processor being connected to said data recorder;

an eighth data processor for optimizing an optimization parameter and determine a plurality of virtual revised control parameters to produce a virtual revised control set, said eighth data processor being connected to said first processor and said data recorder, said optimization parameter yielding a second predicted Process Window Index;

a ninth data processor for comparing said virtual Process Window Index to said second predicted Process Window Index and to a required Process Window Index, said ninth data processor being connected to said eighth data processor and to said data recorder;

a second control input device for setting said processor controller to said virtual revised control set, said second control input device connected to said eighth data processor and to said data recorder;

a control connector for commanding a plurality of control elements, wherein said control connector is connected to said processor controller, said plurality of control elements, said first control input device, said second control input device, said second data processor and said eighth data processor, and said plurality of control elements is selected from at least one of at least one heater, at least one cooler, at least one motor, at least one fan, at least one conveyor and at least one parts loader; and a data connector for connecting said data recorder, said first data processor, said second data processor, said third data processor, said fourth data processor, said fifth data processor, said sixth data processor, said seventh data processor, said eighth data processor, said ninth data processor, said processor temperature instrument and said part temperature instrument.

39. An apparatus according to claim 38 wherein said first data processor, said second data processor, said third data processor, said fourth data processor, said fifth data processor, said sixth data processor, said seventh data processor, said eighth data processor, said ninth data processor or any combination thereof, are replaced by a multi-purpose device.

40. An apparatus according to claim 38 wherein said first control input device and said second control input device are replaced by a multi-purpose device.

41. An apparatus according to claim 38 wherein said second data processor for calculating said plurality of current revised control parameters further includes:

a condition from at least one of a minimum Process Window Index, a maximum conveyor speed, and a minimum difference between said reference plurality of control parameters and said plurality of current revised control parameters; and a current Process Window Index that satisfies a required Process Window Index.

42. An apparatus according to claim 38 wherein said eighth data processor for calculating said plurality of virtual revised control parameters further includes:

a condition from at least one of a minimum Process Window Index, a maximum conveyor speed, and a minimum difference between said reference plurality of control parameters and said plurality of virtual revised control parameters; and a virtual Process Window Index that satisfies a required Process Window Index.

43. An apparatus according to claim 38 further comprising:

a virtual flag that may be set to one of either TRUE or FALSE for deciding if a virtual part temperature is to be calculated when said virtual flag is TRUE or to be measured when said virtual flag is FALSE;

a first FALSE setting of said virtual flag if a difference between said current Process Window Index and predicted Process Window Index is greater than a window tolerance;

a first TRUE setting of said virtual flag if said current Process Window Index is less than said required Process Window Index;

a second FALSE setting of said virtual flag if said plurality of process parameters do not satisfy said drift tolerance; and a second TRUE setting of said virtual flag if said virtual Process Window Index is less than said required Process Window Index.

44. An apparatus according to claim 43 further comprising:

a first instruction to a tenth data processor for revising said control parameter limits if zone compliance with zone tolerance is FALSE, said tenth data processor being connected to said data recorder;

a second instruction to said second data processor for calculating said current revised control set if said virtual flag is FALSE; and a third instruction to said eighth data processor for calculating said virtual revised control set second running optimizer if said virtual flag is TRUE.

45. An apparatus according to claim 44 wherein said first data processor, said second data processor, said third data processor, said fourth data processor, said fifth data processor, said sixth data processor, said seventh data processor, said eighth data processor, said ninth data processor, said tenth data processor or any combination thereof, are replaced by a multi-purpose device.

* * * * *

UNITED STATES PATENT AND TRADEMARK OFFICE
CERTIFICATE OF CORRECTION

PATENT NO.    : 6,453,219 B1                                              Page 1 of 1
DATED         : September 17, 2002
INVENTOR(S)   : Philip C. Kazmierowicz, Eric Dransfeldt and Stanley Douglas Schultz It is certified that error appears in the above-identified patent and that said Letters Patent is hereby corrected as shown below:

Column 2,
Line 31, in between "of" and "the" remove the word "It"

Column 4,
Line 7, in between "or" and "volume" remove the word "it"

Column 5,
Line 44, after the word "current" remove the word "It"

Column 9,
Line 18, in between "such" and "con-" remove the word "It"

Column 13,
Line 50, in between "an" and "alternate" remove the word "it"

Column 20,
Line 66, in between "to" and "determine" remove the word "It"

Signed and Sealed this

Twenty-sixth Day of August, 2003

JAMES E. ROGAN
*Director of the United States Patent and Trademark Office*